(12) United States Patent
Lau et al.

(10) Patent No.: US 6,370,266 B1
(45) Date of Patent: Apr. 9, 2002

(54) FINANCIAL DOCUMENT PROCESSING SYSTEM AND METHOD OF OPERATING A FINANCIAL DOCUMENT PROCESSING SYSTEM TO VERIFY ZONE COORDINATES

(75) Inventors: Simon Lau; Hui Wu, both of Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/292,893

(22) Filed: Apr. 16, 1999

(51) Int. Cl.[7] .................................................. G06K 9/00
(52) U.S. Cl. ...................................... 382/137; 194/209
(58) Field of Search ................................. 382/100, 112, 382/135, 137, 138, 139, 140, 141, 175, 189, 199, 201, 225, 293, 306, 318; 250/559.04, 548, 204, 559.44–559.45; 271/3.14, 3.19; 705/45; 194/207, 209

(56) References Cited

U.S. PATENT DOCUMENTS

| 4,358,671 A | | 11/1982 | Case ........................... 235/379 |
| 4,513,393 A | | 4/1985 | Edlund et al. ................... 710/5 |
| 4,755,808 A | | 7/1988 | Bullock et al. ............. 345/163 |
| 5,058,175 A | * | 10/1991 | Aso ............................. 382/112 |
| 5,349,170 A | | 9/1994 | Kern ............................ 705/45 |
| 5,793,904 A | * | 8/1998 | Clapp et al. ................. 382/318 |
| 5,912,988 A | * | 6/1999 | Moore .......................... 382/112 |
| 5,947,255 A | * | 9/1999 | Shimada et al. ............. 194/207 |
| 5,992,601 A | * | 11/1999 | Mennie et al. .............. 194/207 |
| 6,040,584 A | * | 3/2000 | Liu et al. ..................... 382/135 |
| 6,104,812 A | * | 8/2000 | Koltai et al. ................. 382/135 |

FOREIGN PATENT DOCUMENTS

EP 0436884 7/1991

* cited by examiner

*Primary Examiner*—Jayanti K. Patel
(74) *Attorney, Agent, or Firm*—Michael Chan

(57) ABSTRACT

A financial document processing system has a transport path and an I/O device disposed along the transport path. The system comprises an input device for receiving a set of zone coordinates. An I/O device is disposed along the transport path. A memory is provided for storing a plurality of sets of rules. A processor is provided for (i) obtaining one set of the plurality of sets of rules based upon type of the I/O device, and (ii) applying the one set of rules against the set of zone coordinates to determine if the set of zone coordinates is acceptable. The processor then adjusts the set of zone coordinates based upon application of the set of rules against the set of zone coordinates.

18 Claims, 19 Drawing Sheets

FIG. 2
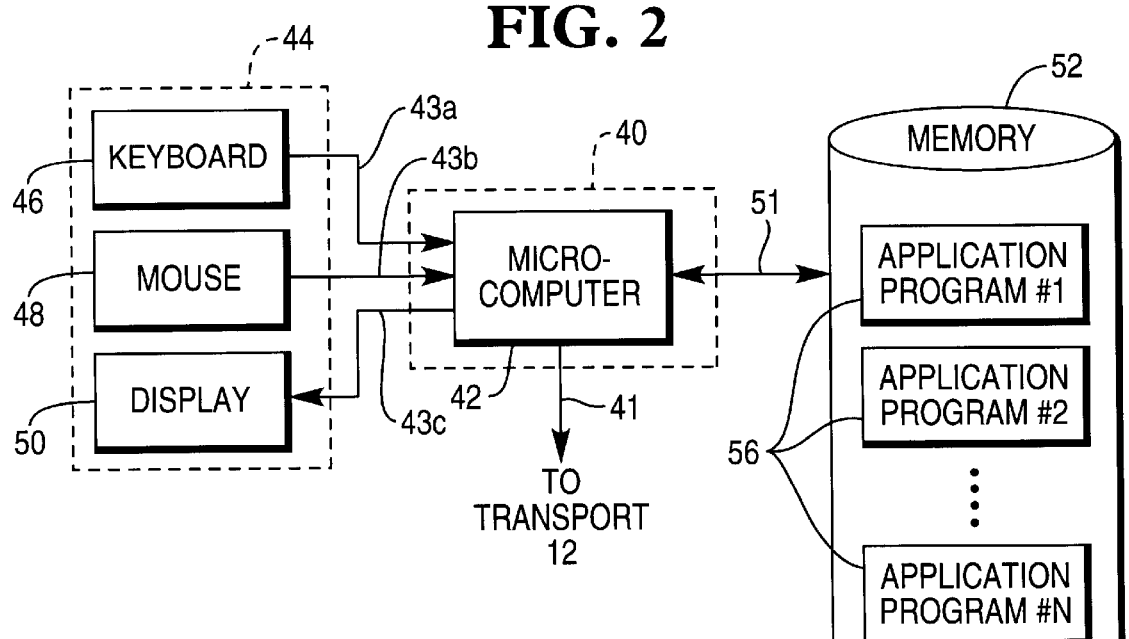
FIG. 3
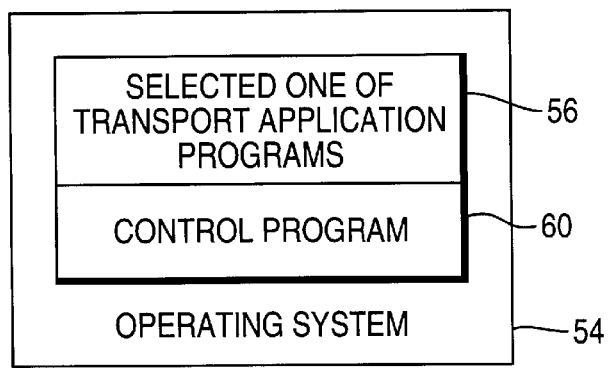
FIG. 5
TRANSPORT CONFIGURATION DATABASE
• TRANSPORT DEVICE KNOWLEDGE BASE
• TRANSPORT CONFIGURATION SETS OF PARAMETERS

FIG. 6

TRANSPORT CONFIGURATION SET (TCS)

| I/O CATEGORY | PROPERTY PAGE # | CODELINE DATA FORMAT REQUIREMENT(S) | FIELD DEFINITION(S) | DEVICE SPECIFIC LINKAGE(S) |
|---|---|---|---|---|
| CODELINE READING | 1 | • CODELINE DIRECTION<br>• USE SPACES? Y/N | • X/Y ZONE COORDINATES | • 7780<br>•• E13B DUAL MICR<br>••• ENABLE E13B REJECT/ REPAIR OPTIONAL ASSIST<br><br>• 7790<br>•• E13B MICR<br>••• STOP FEEDING ON BLACK BAND DETECT<br>••• MICR REPAIR TYPE <FORMAT & PLUG><br>••• READ OPTION ANALOG/DIGITAL<br><br>•• CMC7 MICR<br>••• FONT SWITCH STRING<br>••• FONT SWITCH POSITION |
| . | . | | | |
| . | . | | | |
| . | J | | | |

FIG. 7

TRANSPORT CONFIGURATION SET (TCS)

| I/O CATEGORY | PROPERTY PAGE # | IMAGE DATA FORMAT REQUIREMENT(S) | FIELD DEFINITION(S) | DEVICE SPECIFIC LINKAGE(S) |
|---|---|---|---|---|
| IMAGING | 1 | • TIFF TAGS USED IN IMAGE HEADER | • X/Y ZONE COORDINATES | • 7780<br>•• UPSTREAM CAMERA<br>••• ENABLE BINARY CROPPING<br>••• GRAY COMPRESSION QUALITY FACTOR |
| | 2 | • IMAGE ORIENTATION<br>• IMAGE COLOR | | • 7790<br>•• BI-LEVEL IMAGE MODULE<br>••• FRONT BI-LEVEL THRESHOLD<br>••• REAR BI-LEVEL THRESHOLD |
| | .<br>.<br>K | •• BLACK & WHITE<br>•• GRAY<br>•• COLOR | | • 7731<br>•• IMAGE LIFT MODULE<br>••• ENABLE FRONT GRAY CROPPING<br>••• REAR GRAY QUALITY COMPRESSION FACTOR |

FIG. 8

TRANSPORT CONFIGURATION SET (TCS)

| I/O CATEGORY | PROPERTY PAGE # | ENCODE DATA FORMAT REQUIREMENT(S) | FIELD DEFINITION(S) | DEVICE SPECIFIC LINKAGE(S) |
|---|---|---|---|---|
| ENCODING | 1 | • ENCODE FONT | • X/Y ZONE COORDINATES | • 7780 |
| | 2 | • DEFAULT ENCODE DATA | | •• HIGH SPEED ENCODER |
| | . | | | ••• ENABLE SKEW DETECTION |
| | . | | | ••• ENABLE DOG EAR DETECTION |
| | L | | | |
| | | | | • 7790 |
| | | | | •• HIGH SPEED ENCODER |
| | | | | ••• ENABLE DOG EAR DETECTION |
| | | | | ••• OUTSORT ON ENCODE ERROR |

FINANCIAL DOCUMENT PROCESSING SYSTEM AND METHOD OF OPERATING A FINANCIAL DOCUMENT PROCESSING SYSTEM TO VERIFY ZONE COORDINATES

BACKGROUND OF THE INVENTION

The present invention relates to financial document processing systems, arid is particularly directed to a financial document processing system, such as a check processing system, and a method of operating a financial document processing system to verify zone coordinates for use in a financial document processing system.

A typical check processing system includes a check processing transport which has a document transport path and a number of different hardware devices lying along the document transport path for performing specific document processing operations on documents moving downstream along the document transport path. The check processing system also includes a transport controller having a processor which executes a transport application program which is stored in memory to control operation of the devices lying along the document transport path and thereby to control operation of the check processing transport.

Typical hardware devices lying along the document transport path include I/O devices such as MICR readers, OCR readers, MICR encoders, programmable endorsers, and bank stamps. Each device either reads data from allowable zone(s) of a document or writes data to allowable zone(s) of a document. Any attempt to either read or write data through one of these devices outside of the allowable zone(s) will result in rejection and/or failure during operation of the particular device. Different types of devices (e.g., an OCR reader versus a programmable endorser) as well as similar types of devices (e.g., a single line OCR reader versus a multi line OCR reader) have different allowable data zone(s). Also, devices manufactured by different transport manufacturers may have different allowable zone specifications.

In order to execute a particular transport application program to control operation of the check processing transport, the allowable zone(s) of each device lying along the document transport path need to be specified. There are a number of known methods to specify the allowable zone(s) of each device. One method is to manually enter zone coordinates associated with each allowable zone using a keyboard. A disadvantage in using this method is that it is relatively time consuming and error prone. Another method is to "draw" zone(s) onto an image of a document displayed on a display screen using an input pointer device such as a mouse. A disadvantage in using this method is that the drawn zone(s) may not be acceptable to the particular device during actual operation of the check processing transport.

The disadvantages associated with known methods of specifying allowable zone(s) for devices lying along the document transport path are compounded when different types of documents need to be processed by check processing transports manufactured by different manufacturers. It would be desirable to provide an environment in which allowable zone(s) of devices lying along a document transport path of any check processing transport could be easily and accurately specified.

SUMMARY OF THE INVENTION

In accordance with one aspect of the present invention, a method of operating a financial document processing system to verify zone coordinates for use in a financial document processing system having a transport path and an I/O device disposed along the transport path comprises the steps of (a) receiving a set of zone coordinates, (b) obtaining a signal indicative of the type of I/O device along the transport path, (c) obtaining a set of rules from a database based upon the type of I/O device as indicated by the signal obtained in step (b), and (d) applying the set of rules obtained in step (c) against the set of zone coordinates in step (a) to determine if the set of zone coordinates is acceptable. The set of zone coordinates are then adjusted based upon application of the set of rules against the set of zone coordinates in step (d). The method may also comprise the step of displaying the set of zone coordinates before and/or after the set of rules are applied against the set of zone coordinates in step (d), if in configuring mode.

In accordance with another aspect of the present invention, a financial document processing system has a transport path and an I/O device disposed along the transport path. The system comprises an input device for receiving a set of zone. An I/O device is disposed along the transport path. A memory is provided for storing a plurality of sets of rules. A processor is provided for (i) obtaining one set of the plurality of sets of rules based upon type of the I/O device, and (ii) applying the one set of rules against the set of zone coordinates to determine if the set of zone coordinates is acceptable. The processor then adjusts the set of zone coordinates based upon application of the set of rules against the set of zone coordinates. If in configuring mode, the set of zone coordinates may be displayed before and/or after the set of rules are applied against the set of zone coordinates.

In accordance with yet another aspect of the present invention, a program storage medium readable by a computer having a memory is provided. The medium tangibly embodies one or more programs of instructions executable by the computer to perform method steps for operating a financial document processing system to verify zone coordinates for use in a financial document processing system having a transport path and an I/O device disposed along the transport path. The method comprises the steps of (a) receiving a set of zone coordinates, (b) obtaining a signal indicative of the type of I/O device along the transport path, (c) obtaining a set of rules from a database based upon the type of I/O device as indicated by the signal obtained in step (b), and (d) applying the set of rules obtained in step (c) against the set of zone coordinates in step (a) to determine if the set of zone coordinates is acceptable. The method may also comprise the step of (e) adjusting the set of zone coordinates based upon application of the set of rules against the set of zone coordinates in step (d).

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a schematic block representation of a portion of FIG. 1 and showing a memory in which software is stored;

FIG. 3 is a layered representation of software stored in the memory of FIG. 2;

FIG. 5 is a representation of a transport configuration database used in the one layer of software of FIG. 4;

FIGS. 6–8 are charts showing arrangement and relationships of certain data fields in a transport configuration database of FIG. 5;

DETAILS OF THE INVENTION

Figure 1:
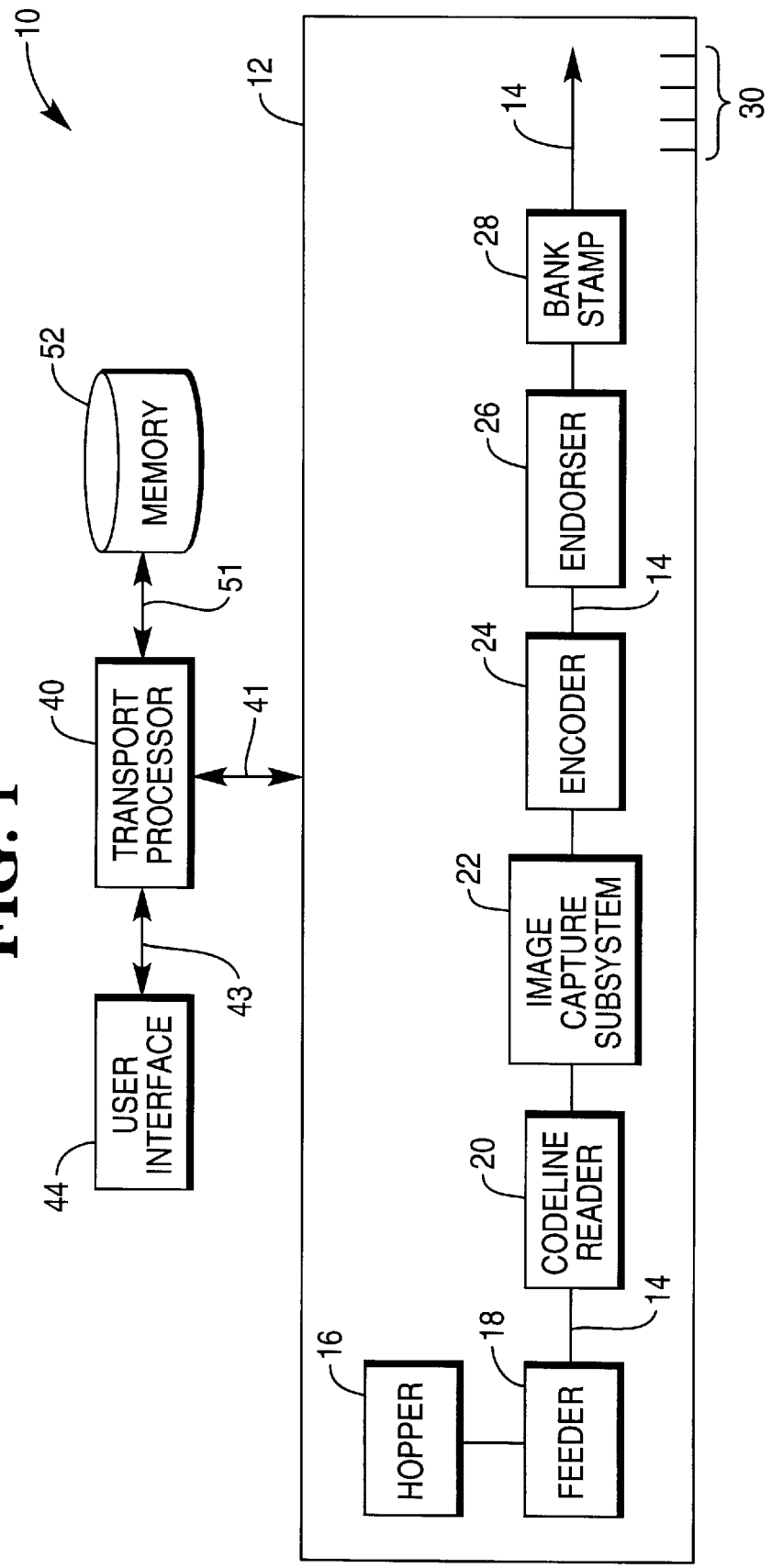
FIG. 1 is a schematic block representation of an image-based check processing system embodying the present invention.

The present invention is directed to financial document processing systems, and is particularly directed to a method of operating a financial document processing system. The specific construction and use of the financial document processing system may vary. By way of example, a financial document processing system in the form of an image-based check processing system 10 is illustrated in FIG. 1. The check processing system 10 may be, for example, a sorting machine or a proof machine wherein financial documents such as checks are processed in a data processing operation.

As shown in FIG. 1, the check processing system 10 includes a check processing transport 12 having a document track which defines a document transport path 14 along which financial documents (i.e., items), such as checks, can be transported from an upstream end to a downstream end. The transport 12 includes a number of different hardware devices lying along the document transport path 14 for performing specific document processing operations on documents moving along the document transport path 14. The transport 12 includes a hopper 16 into which a stack of financial documents including checks are placed. A document feeder 18 adjacent the hopper 16 selectively feeds or drives each document from the stack of documents in the hopper to transport the document from the upstream end to the downstream end along the document transport path 14 to sorting bins 30 (i.e., pockets) located at the end of the document transport path.

The check processing system 10 further includes a codeline reader 20 such as a MICR reader located along the document transport path 14. The MICR reader 20 reads a MICR codeline from each check being processed in a known manner. Alternatively, the codeline reader may be an OCR reader instead of a MICR reader depending upon on the particular application. The check processing system 10 further includes an image capture subsystem 22 located along the document transport path 14. The image capture subsystem 22 captures an image of each document for a number of different purposes well known in the art. More specifically, the image capture subsystem 22 includes an imaging camera (not shown) which is controlled to capture images of documents moving along the document transport path 14.

An encoder 24 encodes missing fields on each check. An endorser 26 applies an endorsement in a known manner to each check. A bank stamp 28 stamps each check to identify the bank institution processing the check. The structure and operation of MICR readers, OCR readers, imaging cameras, encoders, endorsers, and bank stamps are well known and, therefore, will not be described.

Referring to FIGS. 1 and 2, the check processing system 10 further includes a transport processor 40 and a user interface 44 which communicates via signals on line 43 (FIG. 1) with a microcomputer 42 of the transport processor 40. The user interface 44 includes a keyboard 46, a mouse 48, and a display 50, all of which communicate via signals on lines 43a, 43b, 43c (FIG. 2) with the microcomputer 42. The microcomputer 42 controls operation of the transport 12 via signals on line 41. Suitable microcomputers and memories are readily available in the marketplace. Their structure and operation are well known and, therefore, will not be described. The check processing system 10 also includes a memory 52 which communicates via signals on line 51 with the microcomputer 42. An operating system 54 is stored in the memory 52. Preferably, the operating system 54 comprises WINDOWS NT offered by Microsoft Corporation, located in Redmond, Wash. A number of different transport application programs 56 are also stored in the memory 52. As shown in FIG. 2, there are "N" number of different transport application programs stored in the memory 52. Each of the transport application programs 56 is associated with a particular type of document processing work. For example, transport application #1 may be associated with one type of work, such as proof of deposit, while transport application #2 is associated with a different type of work, such as remittance processing. Another type of work may be sorting of items A control program 60 is also stored in the memory 52. As best shown in FIG. 3, the control program 60 includes a layer of software that interfaces between the operating system 54 and a selected one of the transport application programs 56. The control program 60 allows the selected one of the transport application programs 56 to use the hardware devices of the transport 12. The control program 60 also allows different transports and/or different hardware devices to be used in the check processing system 10 shown in FIG. 1 without requiring changes to any of the transport application programs 56. Details and operation of the control program 60 are described hereinbelow.

Figure 4:
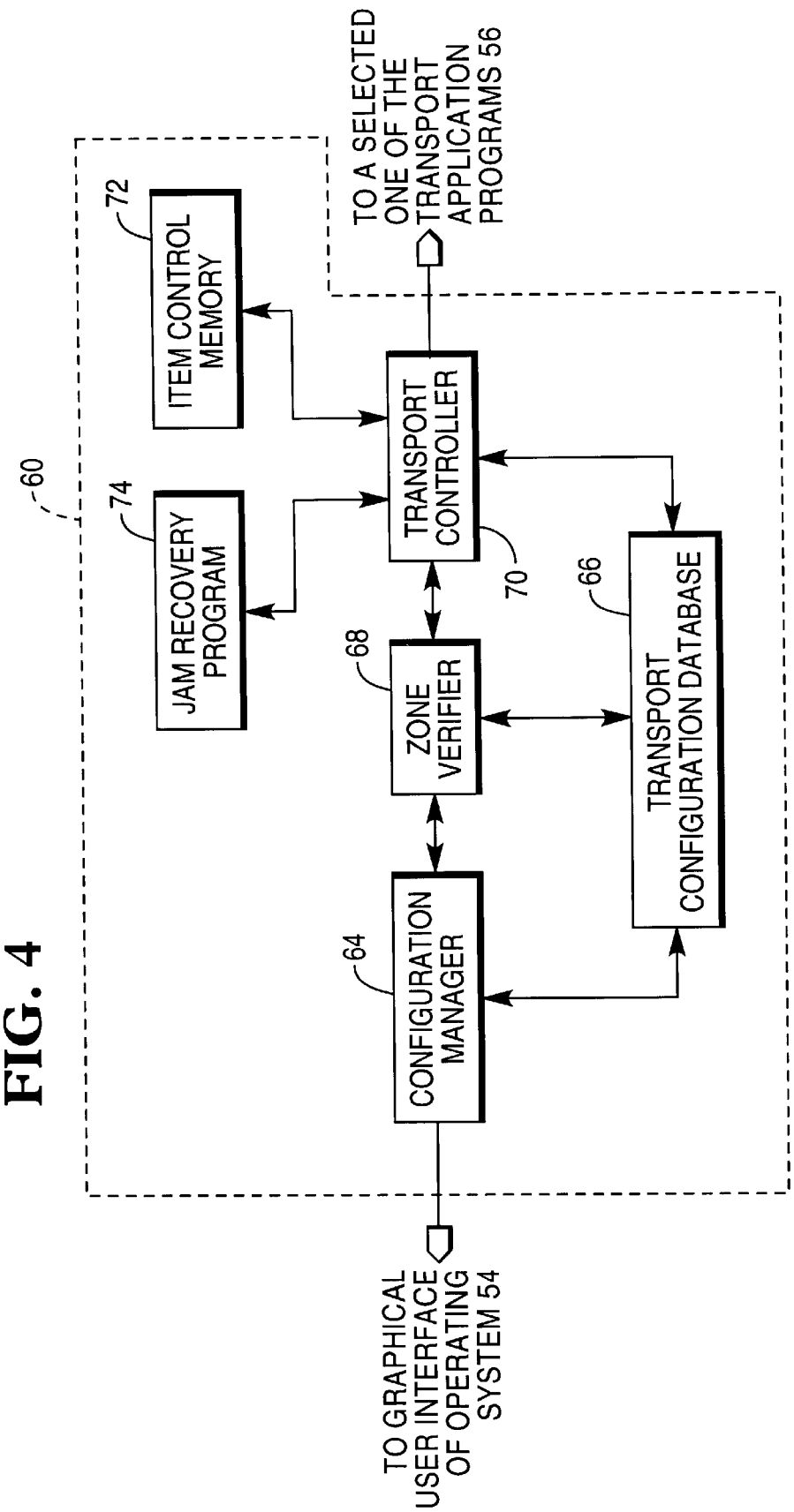
FIG. 4 is a block representation of one layer of software shown in FIG. 3.

Referring to FIG. 4, the control program 60 includes a number of interconnected components. The interconnected components include a configuration manager 64 which communicates with a graphical user interface of the operating system 54, a transport configuration database 66 which will be described in detail later, and a zone verifier 68 which will also be described in detail later. The configuration manager 64 allows a person, such as a system designer, to enter data into and view data from the transport configuration database 66 via the graphical user interface. The control program 60 also includes a transport controller 70 which processes data from the zone verifier 68 and data from the transport configuration database 66 to provide control data for the selected one of the transport application programs 56 to control the transport 12 and the different hardware devices which lie along the document transport path 14.

The control program 60 further includes an item control memory 72 which stores sequence numbers, MICR codelines, image data, encoder status, endorsement status, and bank stamp status associated with items which have been processed in accordance with the transport application program 56. The item control memory 72 also stores data relating to certain items during an exception recovery process. More specifically, the data stored in the item control memory 72 represents the current state of output operations (i.e., all completed and incomplete input/output operations)

for each item involved in an exception condition along the document transport path 14. The control program 60 also includes an exception recovery program 74 which will be described in detail later.

Referring to FIGS. 4 and 5, the transport configuration database 66 includes a transport device knowledge database (TDKB) and a number of different transport configuration sets of parameters. The TDKB contains zone information rules which will be described in detail later in connection with description of the zone verifier 68. The transport configuration sets of parameters contain device-related parameters for all types of devices which are contemplated to be used in the transport 12 of the check processing system 10. The transport configuration sets of parameters also include transport-related parameters for all types of transports which are contemplated to be used in the transport 12. The transport configuration sets of parameters further contain general document processing requirements for different types of documents which are expected to be processed by the transport 12.

During operation of the check processing system 10, one set of the transport configuration sets of parameters is selected to allow the selected one of the transport application programs 56 to control operation of the hardware device of the transport 12 in accordance with the selected set of parameters. The selected one of the different transport configuration sets of parameters will referred to hereinafter as the "TCS".

As shown in FIGS. 6–8, the TCS has a number of different data fields. The names of the data fields include "I/O category", "Property Page Number", "Data Format Requirement(s)", "Field Definition(s)", and "Device Specific Linkage(s)". Each I/O category corresponds to a specific document processing function to be performed by a hardware device of the transport 12. The I/O categories may include a codeline reading function of the transport 12 such as shown in FIG. 6, an imaging function of the transport such as shown in FIG. 7, and an encoding function of the transport such as shown in FIG. 8.

Referring to FIG. 15, a number of different property pages (e.g., "J" number of property pages as shown in FIG. 6) is associated with the codeline reading function of the transport 12. For each property page, a codeline data format requirement(s) field, a field definition(s) field, and a device specific linkage(s) field are associated with that particular property page. The codeline data format requirement(s) field may include subfields which define (i) codeline direction, and (ii) use spaces, for examples. The field definition(s) field may include subfields which define X/Y zone coordinates which indicate location on a document where reading is to be performed, for example. The information contained in the subfields of the codeline data format requirement(s) field and the information contained in the subfields of the field definition(s) field are well understood by one skilled in the art and, therefore, will not be described.

The device specific linkage(s) field includes subfields which define transport model numbers, such as 7780 and 7790, both available from NCR Corporation, located in Dayton, Ohio. For each transport model number, there may be a number of different types of MICR readers associated with that particular transport model number. As shown in FIG. 6, an E13B dual MICR reader is associated with transport model number 7780. One specific characteristic is associated with the E13B dual MICR reader which is associated with transport model number 7780. The specific characteristic is enable E13 reject/repair optional assist which is a characteristic well understood by those skilled in the art and, therefore, will not be described.

Also, as shown in FIG. 6, an E13B MICR reader is associated with transport model number 7790. Three specific characteristics are associated with the E13B MICR reader which is associated with transport model number 7790. The three specific characteristics are (i) stop feeding on black band detect, (ii) MICR repair type, and (iii) read option. Similarly, a CMC7 reader is also associated with transport model number 7790. Two specific characteristics are associated with the CMC7 MICR reader which is associated with transport model number 7790. The two specific characteristics are (i) font switch string, and (ii) font switch position. These characteristics of E13B MICR readers and CMC7 MICR readers as well as other characteristics of MICR readers are well understood by those skilled in the art and, therefore, will not be described.

Although only two transport model numbers are shown in the device specific linkage(s) field in FIG. 6, it should be understood that any number of transport models having any particular type of MICR reader could be included in the device specific linkage(s) field. This will depend upon what combinations of different transport model numbers and different MICR reading devices are expected to be used in the check processing system 10.

Referring to FIG. 7, a number of different property pages (e.g., "K" number of property pages shown in FIG. 7) is associated with the imaging function of the transport 12. For each property page, an image data format requirement(s) field, a field definition(s) field, and a device specific linkage(s) field are associated with that particular property page. The image data format requirement(s) field may include subfields which define (i) TIFF (Tagged Image File Format by Adobe Systems Incorporated, located in San Jose, Calif.) tags used in an image header, (ii) image orientation, (iii) image color such as black/white, gray, or color. The field definition(s) field may include subfields which define X/Y zone coordinates which indicate location on a document where imaging is to be performed, for example. The information contained in the subfields of image data format requirement(s) and the information contained in the subfields of field definition(s) are well understood by one skilled in the art and, therefore, will not be described.

The device specific linkage(s) field includes subfields which define transport model numbers, such as 7780, 7790, and 7731, all available from NCR Corporation, located in Dayton, Ohio. For each transport model number, there may be a number of different types of image capture devices associated with that particular transport model number. As shown in FIG. 7, an upstream camera is associated with transport model number 7780. Two specific characteristics are associated with the upstream camera which is associated with transport model number 7780. The two specific characteristics are (i) enable binary cropping, and (ii) gray compression quality factor. These two characteristics of imaging cameras as well as other characteristics of imaging cameras are well understood to those skilled in the art and, therefore, will not be described.

Also, as shown in FIG. 7, a bi-level image module is associated with transport model number 7790. Two specific characteristics are associated with the upstream camera which is associated with transport model number 7780. The two specific characteristics are (i) front bi-level threshold, and (ii) rear bi-level threshold. Similarly, an image lift module is associated with transport model number 7731. Two specific characteristics are associated with the upstream camera which is associated with transport model number 7731. The two specific characteristics are (i) enable front gray cropping, and (ii) rear gray quality compression factor. The specific characteristics of imaging module as well as other characteristics of imaging modules are well understood to those skilled in the art and, therefore, will not be described.

Although only three transport model numbers are shown in the device specific linkage(s) field in FIG. 7, it should be understood that any number of transport models having any particular type of imaging camera/module could be included in the device specific linkage(s) field. This will depend upon what combinations of different transport model numbers and different imaging cameras/modules are expected to be used in the check processing system 10.

Referring to FIG. 8, a number of different property pages (e.g., "L" number of property pages shown in FIG. 8) is associated with the encoding function of the transport 12. For each property page, an encode data format requirement (s) field, a field definition(s) field, and a device specific linkage(s) field are associated with that particular property page. The encode data format requirement(s) field may include subfields which define (i) encode fonts, and (ii) default encode data. The field definition(s) field may include subfields which define X/Y zone coordinates which indicate location on a document where encoding is to be performed, for example. The information contained in the subfields of encode data format requirement(s) and the information contained in the subfields of field definition(s) are well understood by one skilled in the art and, therefore, will not be described.

The device specific linkage(s) field includes subfields which define transport model numbers, such as 7780 and 7790, both available from NCR Corporation, located in Dayton, Ohio. For each transport model number, there may be a number of different types of encoding devices associated with that particular transport model number. As shown in FIG. 8, a high speed encoder is associated with transport model number 7780. Two specific characteristics are associated with the high speed encoder which is associated with transport model number 7780. The two specific characteristics are (i) enable skew detection, and (ii) enable dog ear detection, These two characteristics of encoding devices as well as other characteristics of encoding devices are well understood to those skilled in the art and, therefore, will not be described.

Also, as shown in FIG. 8, a high speed encoder is associated with transport model number 7790. Two specific characteristics are associated with the high speed encoder which is associated with transport model number 7790. The two specific characteristics are (i) enable dog ear detection, and (ii) outsort on encode error. The specific characteristics of encoding devices as well as other characteristics of encoding devices are well understood to those skilled in the art and, therefore, will not be described.

Although only two transport model numbers are shown in the device specific linkage(s) field in FIG. 8, it should be understood that any number of transport models having any particular type of encoding devices could be included in the device specific linkage(s) field. This will depend upon what combinations of different transport model numbers and different encoding devices are expected to be used in the check processing system 10.

Also, although only three I/O categories (codeline reading, imaging, and encoding) are described hereinabove, it should be understood that other I/O categories, such as document feeding, endorsing, and bank stamping, may be included as well.

Figure 9:
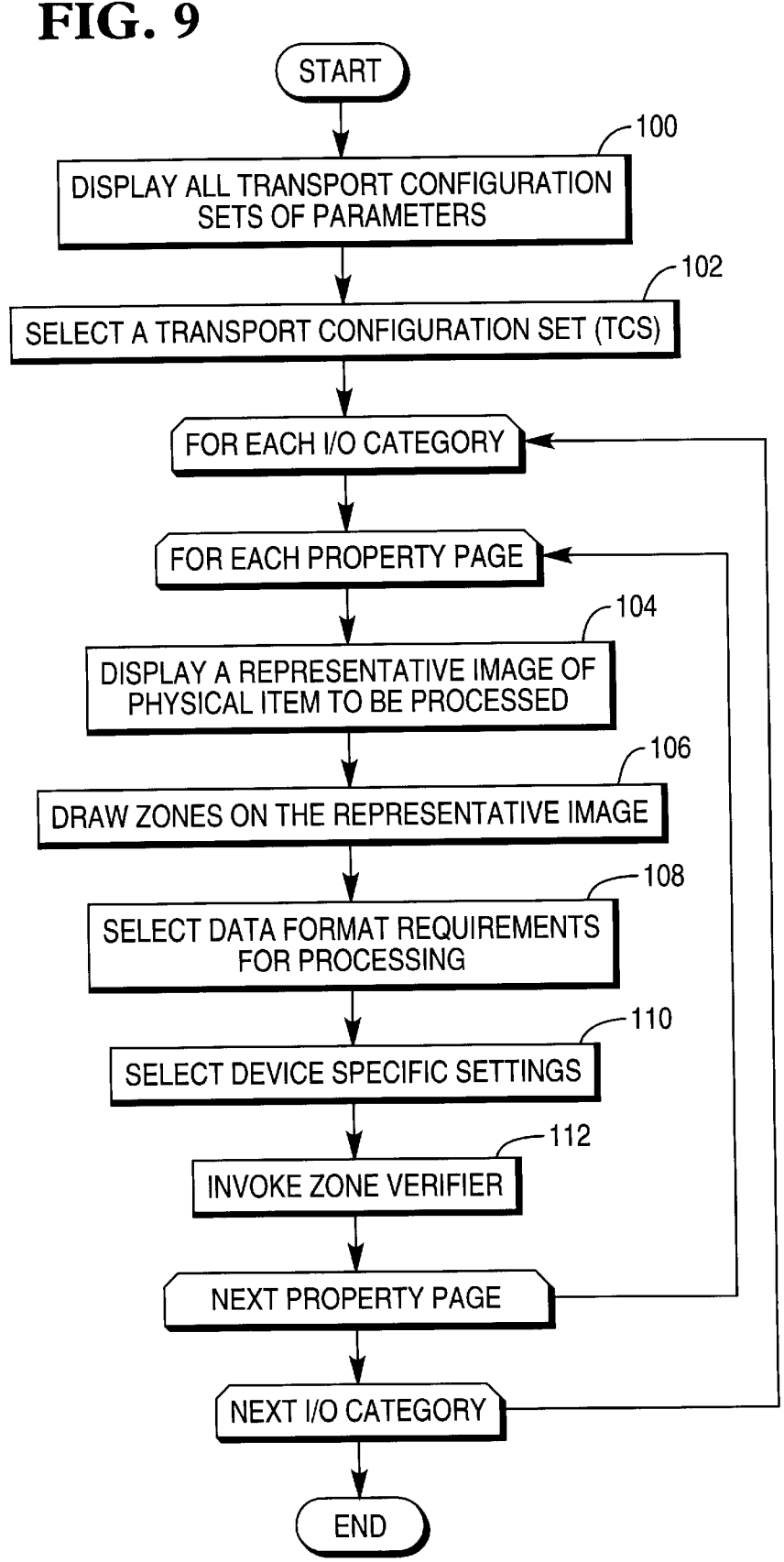
FIG. 9 is a flowchart depicting processes carried out during configuring mode of the check processing system of FIG. 1.

Referring to FIG. 9, a flowchart depicts operation of the check processing system 10 in configuring mode when a system designer is inputting data into the transport configuration sets of parameters in the transport configuration database 66 to define parameters for different transports and/or hardware devices which may be used in the check processing system 10.

In step 100, all transport configuration sets of parameters stored in the transport configuration database 66 are displayed on the display 50 for the system designer to view. In step 102, the system designer selects one of the transport configuration sets of parameters (i.e., the TCS) depending upon the particular document processing work to be performed. The program then proceeds to step 104 in which for each property page within each I/O category, a representative image of the physical item to be processed is displayed on the display 50 for the system designer to view. The system designer then draws zones on the representative image of the physical item to be processed as shown in step 106. The system designer also selects data format requirements and specific hardware device settings as shown in steps 108 and 110.

The zone verifier 68 is then invoked in step 112. Briefly, when the zone verifier 68 is invoked in step 112, a representative image of how the physical item will be processed on the transport 12 will be displayed on the display 50 for the system designer to view. At this point, the system designer makes any needed adjustments to the data format requirements and/or specific hardware device settings. Further details of operation of the zone verifier 68 will be described later. The system designer continues the above-described steps for each physical item type within each I/O category until the configuring process is completed.

Figure 10A:
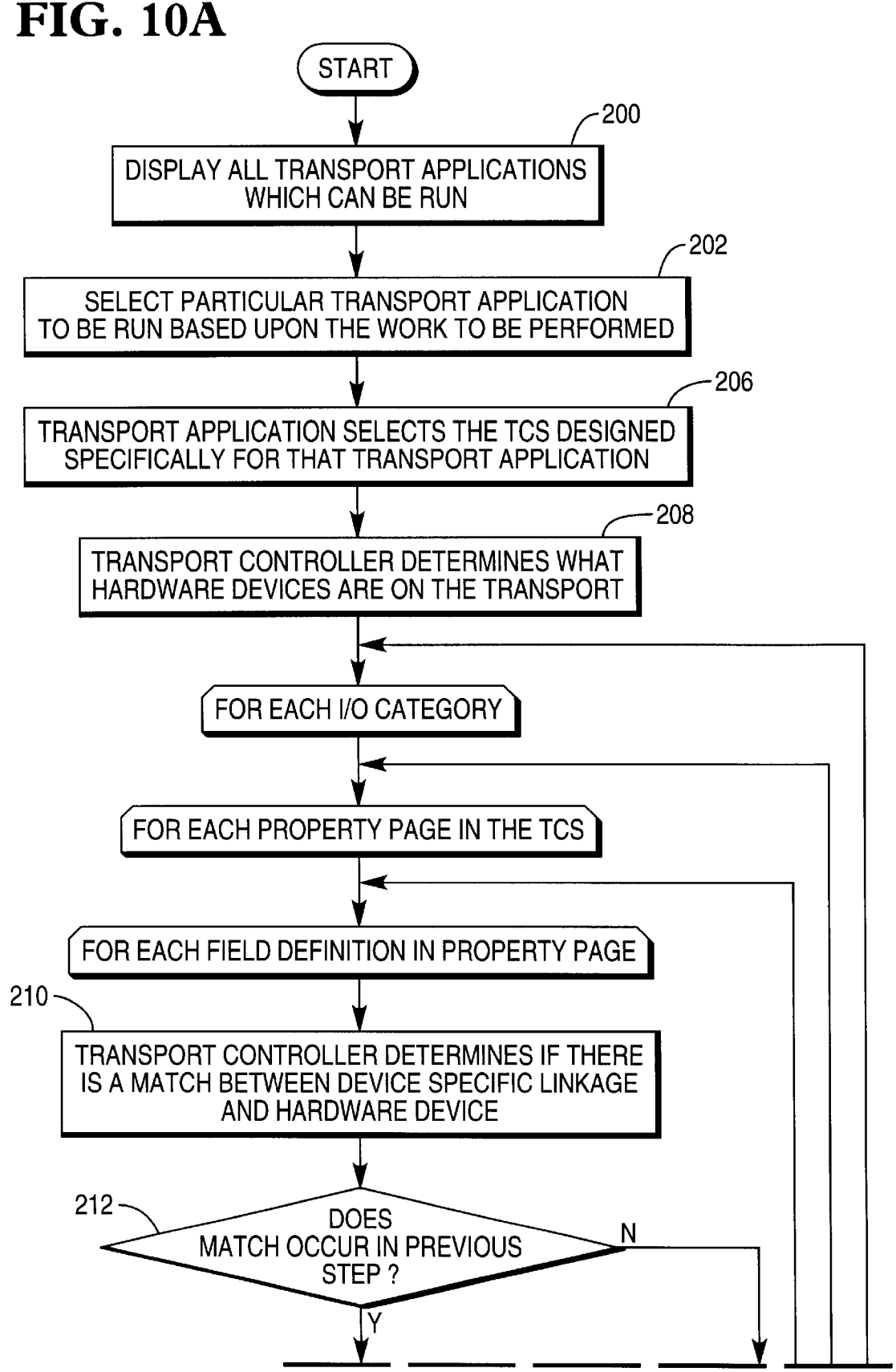
FIGS. 10A–C a flowchart depicting processes carried out during operating mode of the check processing system of FIG. 1.
Figure 10B:
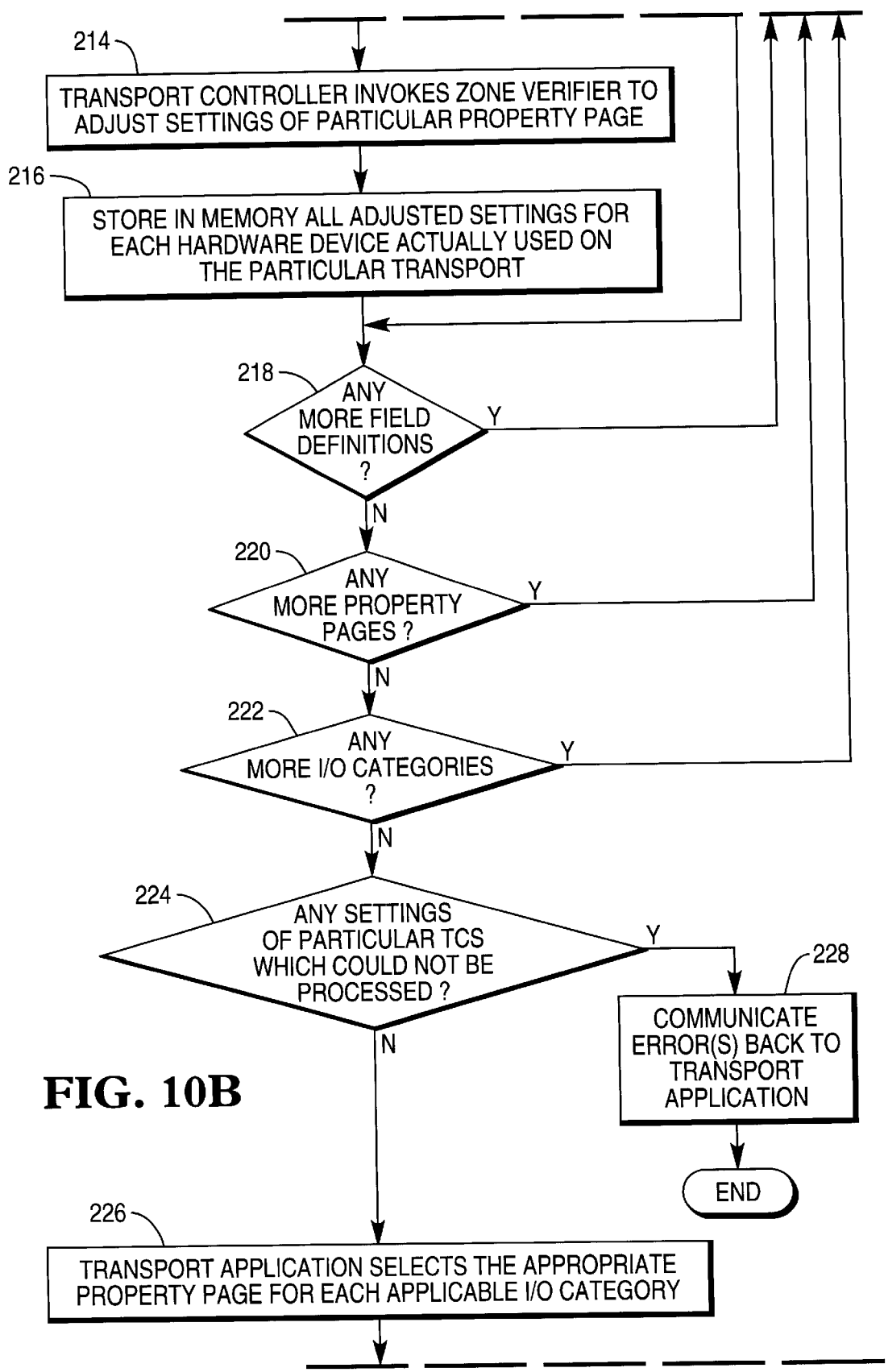
Figure 10C:
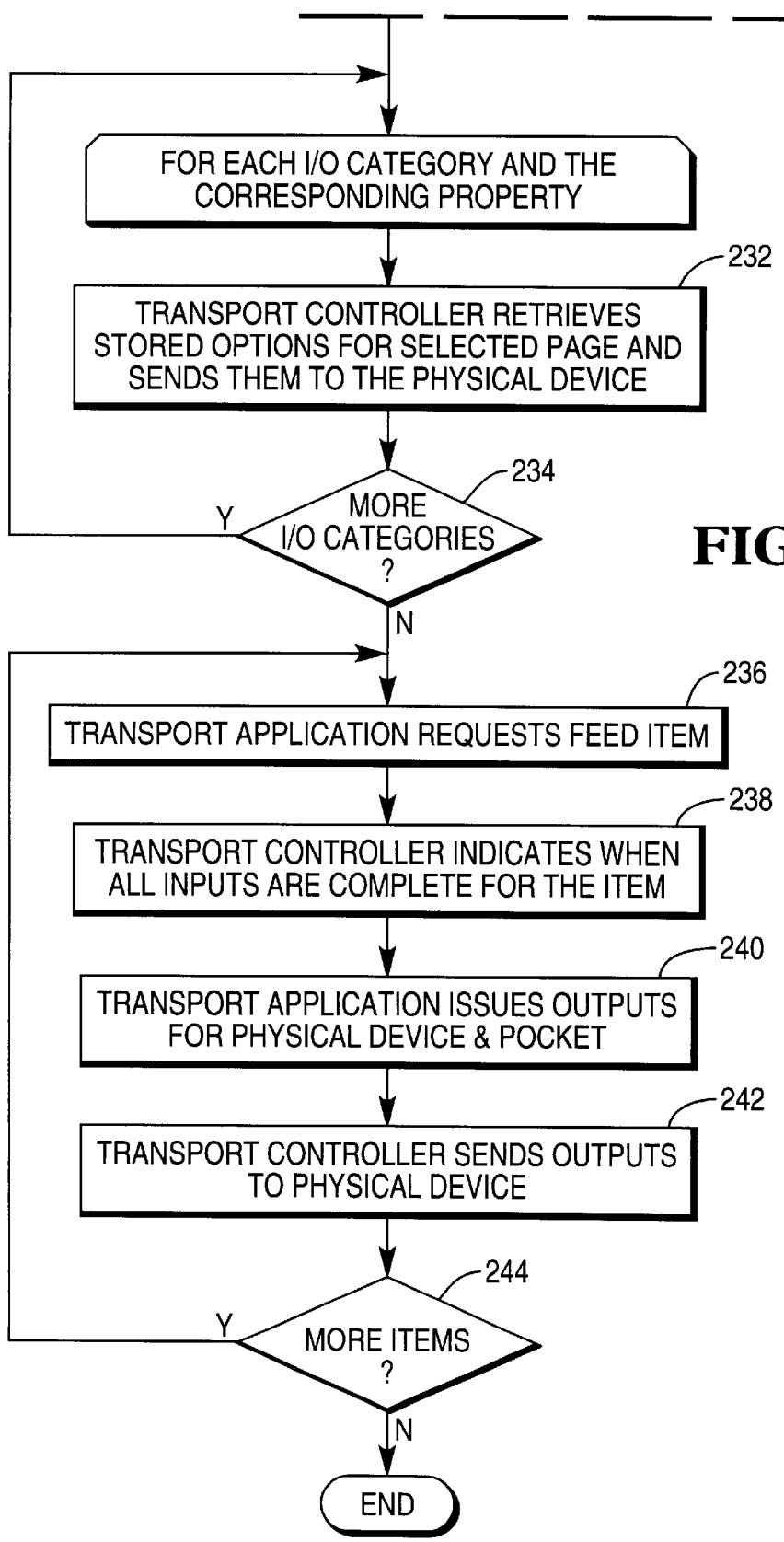

Referring to FIGS. 10A, 10B, and 10C, a flowchart depicts operation of the check processing system 10 in operating mode when the transport 12 is operating in accordance with the selected one of the transport application programs 56 stored in the memory 52. In step 200, all of the transport application programs 56 which can be run are displayed on the display 50 for an operator to view. The operator then selects one of the transport application programs 56 based upon the particular document processing work which is to be performed. The process then proceeds to step 206 in which the selected transport application program selects the TCS for that particular transport application program. Then, in step 208, the transport controller 70 determines what hardware devices are actually on the transport 12. The process then proceeds to step 210 in which for each field definition within each property page within each I/O category, the transport controller 70 determines if there is a match between a device specific linkage and a hardware device which is actually being used on the transport 12. More specifically, the transport controller 70 determines if there is a match by determining if there is at least one hardware device on the transport 12 capable of performing function of the I/O category defined by the property page.

The process then proceeds to step 212 in which a determination is made as to whether a match occurred in step 210. If the determination in step 212 is negative, the process proceeds directly to step 218. However, if a match is found as determined in step 212, the process proceeds to step 214 in which the transport controller 70 invokes the zone verifier 68 to make any needed adjustments to settings of the particular property page under consideration. These adjustments are made based upon zone information rules stored in the TDKB to be described in detail later. As shown in step 216, any adjustments to settings of the particular property page are stored in the transport configuration database 66.

The process then proceeds to step 218 in which a determination is made in step 218 as to whether there are more field definitions to consider. Also, a determination is made in step 220 as to whether there are more property pages to consider, and a determination is made in step 222 as to whether there are more I/O categories to consider. When all field definitions, all property pages, and all I/O categories have been considered, the process proceeds to step 224. In step 224, a determination is made as to whether there were any settings of the TCS which could not be processed. If the determination in step 224 is affirmative, the process proceeds to step 228 to communicate to the operator that there is an error present. At this point, the operator terminates the process. Otherwise, if the determination in step 224 is negative, the process proceeds to step 226.

In step 226, the selected transport application program selects the applicable property page from each applicable I/O category and is now ready to process items. The process then proceeds to step 232 in which for each I/O category and the corresponding property page which was selected in step 226 the transport controller 70 obtains from memory (i.e., the transport configuration database 66) the stored options for the selected property page. This data is then sent to the hardware device on the transport 12 to control that device accordingly.

The process then proceeds to step 234 to determine if there are more I/O categories to consider. If the determination is affirmative, then the process loops back to step 230 to consider the next I/O category. If the determination in step 234 is negative (indicating that all I/O categories have been considered), then the process proceeds to step 236 in which the selected transport application program requests an item to be fed from the hopper 16. The transport controller 70 indicates when all inputs are complete for that item, as shown in FIG. 238. After all inputs are completed for the item, the selected transport application program provides outputs to the device and the associated pocket to control that device and that pocket accordingly, as shown in step 240. A determination is then made in step 244 as to whether there are more items to process. If the determination in step is affirmative, then the process loops back to step 236 to process the next item. Otherwise, all items have been processed and the process ends.

A number of advantages are provided when either configuring or operating the financial document processing system 10 as described hereinabove. One advantage is that development of the transport application programs 56 stored in the memory 52 is simplified. Transport application program development is simplified because changes to the transport application programs 56 are in most instances not needed when either the transport 12 and/or a hardware device is changed, added, or removed. Accordingly, another advantage is that custom programming of the transport application programs 56 is not needed to accommodate different types of transports and/or different types of hardware devices used in the transports. The transport processor 40 is able to control operation of the transport and the hardware devices in the transport 12 independent of the type of transport and/or type(s) of device(s) used in the transport.

Another advantage is that hardware devices in the transport are allocated, without human intervention, for a document processing job to be performed. The hardware devices in the transport are allocated based upon the type of work to be done (i.e., type of document to be processed) and the types of the actual devices used in the transport. For example, if a document processing job to be performed requires three lines of endorsement data to be printed and only three single-line endorsers are available on the transport, then the endorsement data could be allocated to the three endorsers such that each endorser prints one of the three required lines of endorsement data.

Still another advantage is that a single transport configuration database 66 is provided to support all types of transports and all types of hardware devices contemplated to be used in the check processing system 10. Since only a single configuration database 66 is used to define all types of transports and all types of hardware devices, maintenance and updating of data associated with multiple hardware configurations are more easily accomplished.

Figure 11A:
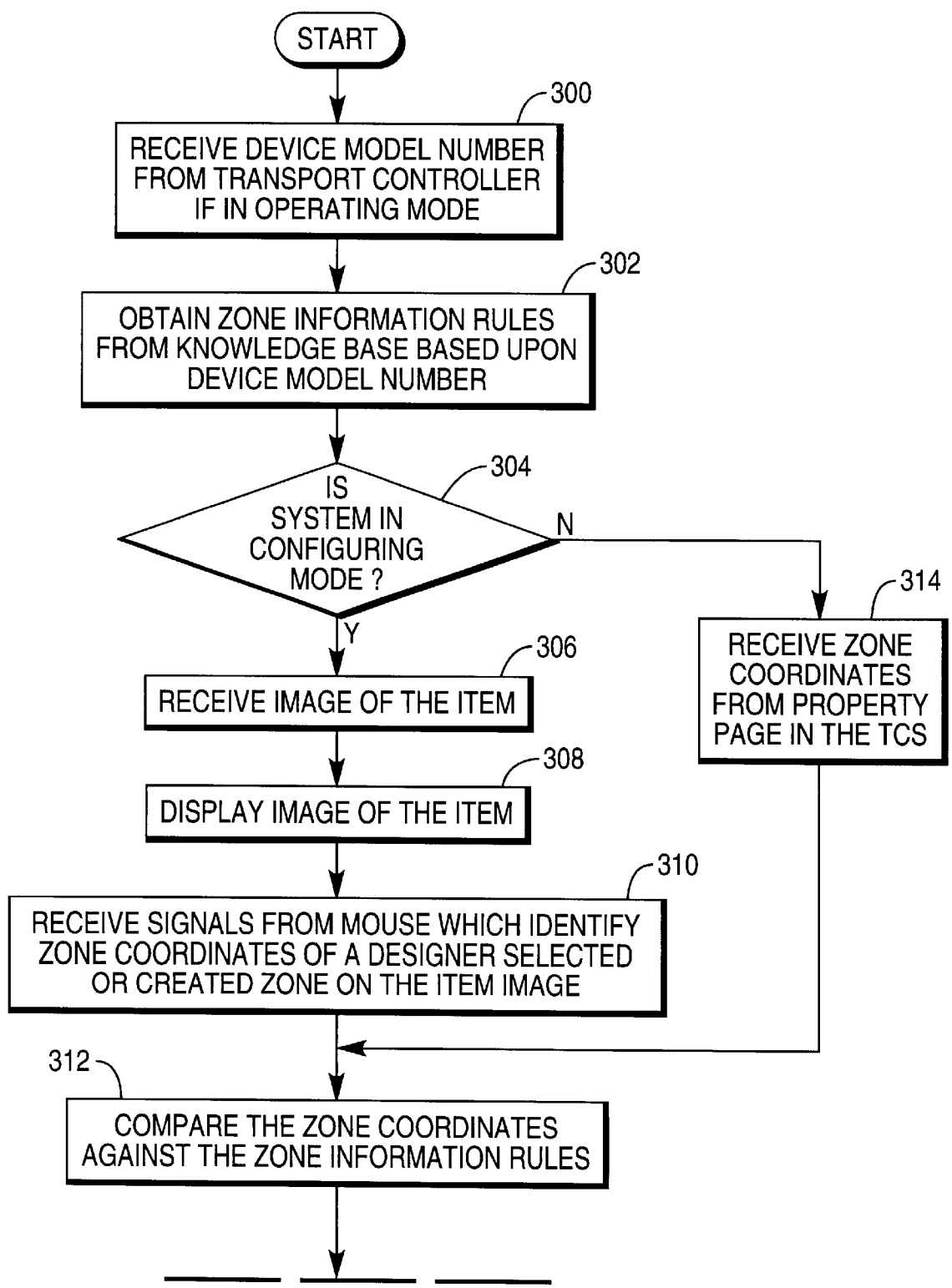
FIGS. 11A–B is a flowchart depicting processes carried out by a zone verifier in the flowcharts of FIGS. 9 and 10.
Figure 11B:
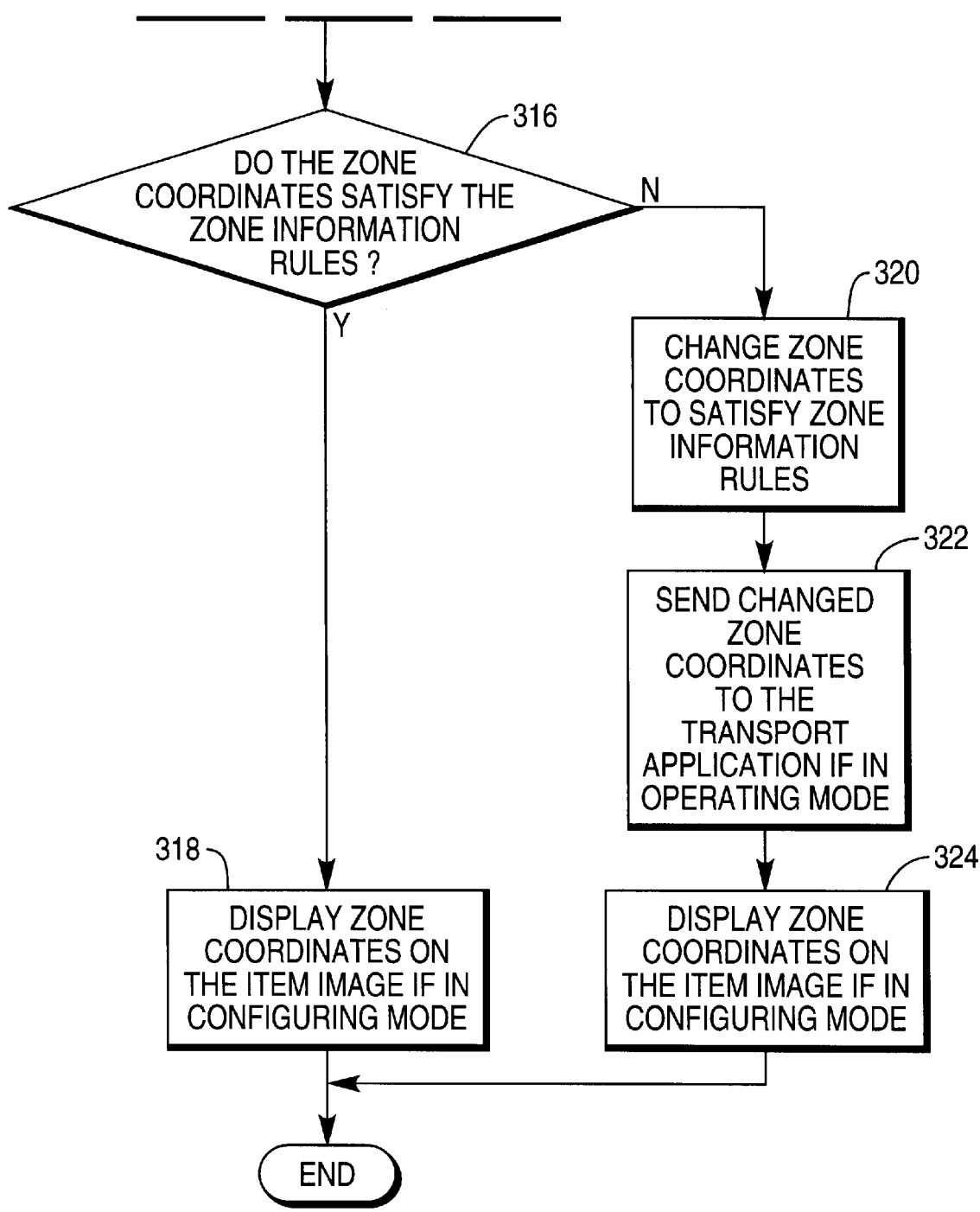

Referring to FIGS. 11A and 11B, a flowchart depicts operation of the zone verifier 68 shown in FIG. 4 in either configuring mode or operating mode of the check processing system 10. In step 300, the zone verifier 68 receives a hardware device model number from the transport controller 70 if in operating mode or from a system designer via the configuration manager 64 if in configuring mode. The process proceeds to step 302 in which zone information rules are obtained from the TDKB of the transport configuration database 66 based upon the hardware device model number received from either the transport controller 70 or the system designer. A determination is made in step 304 as to whether the check processing system 10 is in configuring mode or in operating mode.

If the determination in step 304 is such that the system 10 is in configuring mode, the process proceeds to step 306 in which an image of the item is received and then displayed on the display 50 as shown in step 308. The process then proceeds to step 310 in which inputs are received from a system designer via the mouse 48. The inputs from the system designer via the mouse 48 identifies zone coordinates of either a designer selected or a designer created zone on the image of the item displayed on the display 50. The process then proceeds to step 312. However, if the determination in step 304 is such that the system 10 is in operating mode, then the process proceeds to step 314 in which zone coordinates are received from the associated property page in the TCS before proceeding to step 312.

In step 312, the zone coordinates received from either the mouse 48 when in configuring mode or the property page in the TCS when in operating mode are compared against the zone information rules obtained from the TDKB of the transport configuration database 66. A determination is made in step 316 as to whether the zone coordinates satisfy the zone information rules based upon the comparisons made in step 312. If the determination in step 316 is such that the zone coordinates do satisfy the zone information rules and the system 10 is in operating mode, then the process is completed. If the determination in step 316 is such that the zone coordinates do satisfy the zone information rules and the system 10 is in configuring mode, then the zone coordinates are displayed on the image of the item displayed on the display 50 to allow the system designer to view before the process is completed.

However, if the determination in step 316 is such that the zone coordinates do not satisfy the zone information rules and the system 10 is in either configuring mode or operating mode, then the process proceeds to step 320. In step 320, the zone coordinates are changed to satisfy the zone information rules. Five examples of how the zone coordinates may be changed to satisfy certain zone information rules will be discussed hereinbelow with reference to FIGS. 12–16. The process then proceeds to step 322 in which the changed zone coordinates are sent to the transport application program, if in operating mode, via the transport controller 70 for use in processing items. The changed zone coordinates are displayed on the image of the item displayed on the display 50, if in configuring mode, to allow the system designer to view the changed zone coordinates as shown in step 324.

Referring to FIGS. 12–16, a number of different examples of zone verification are illustrated to show how the zone verifier 68 shown in FIG. 4 works using zone information rules obtained from the TDKB.

Figure 12A:
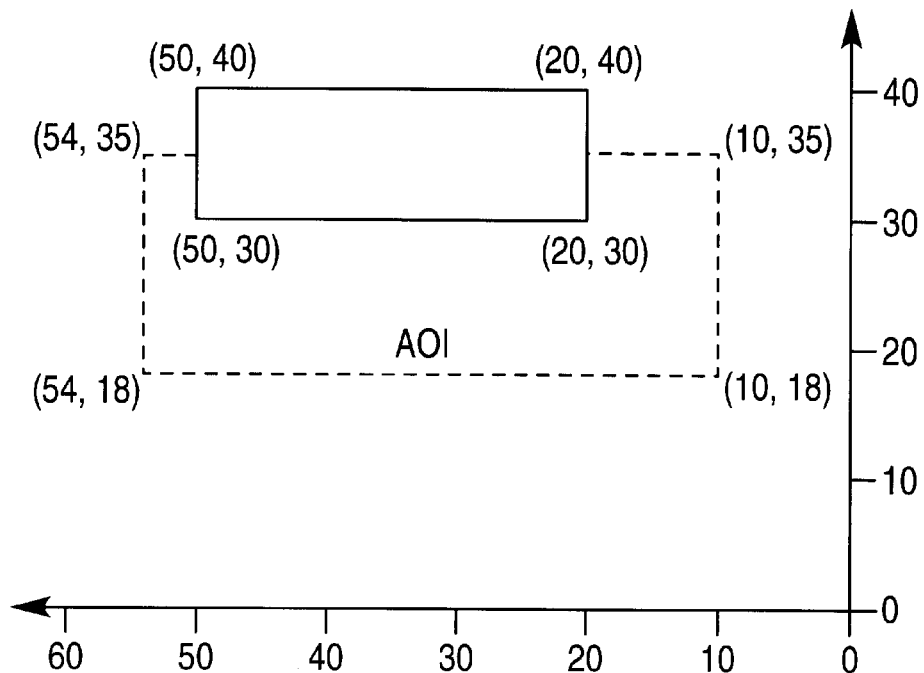
FIGS. 12–16 are examples of zone verification performed in the flowchart of FIG. 11.
Figure 12B:
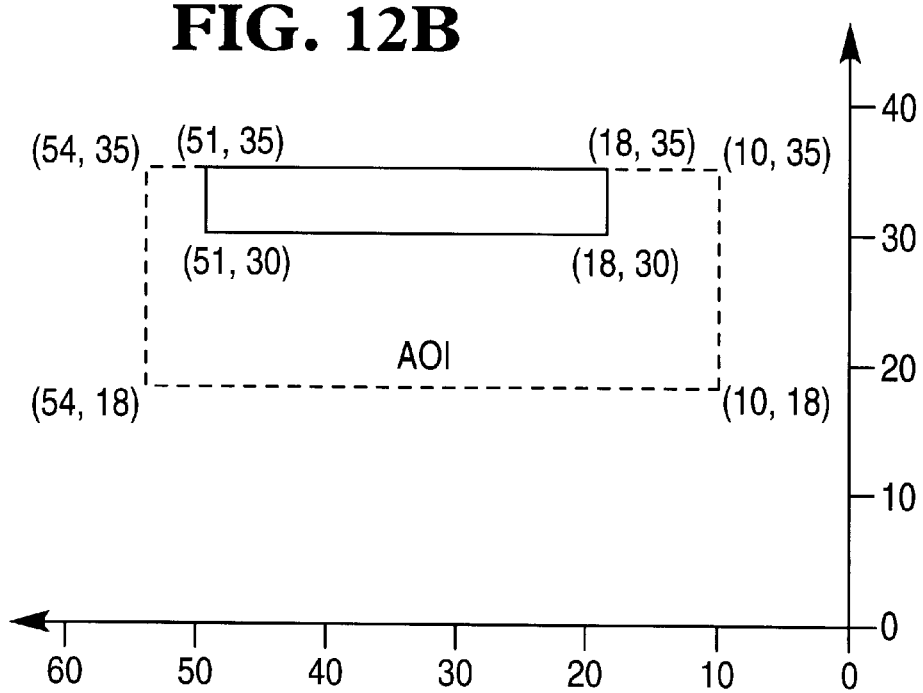

FIGS. 12A and 12B show how zone coordinates are changed using zone information rules which are directed to an area of interest (AOI). The AOI has coordinates of (54, 35), (10, 35), (54, 18), and (10, 18), as shown in FIGS. 12A and 12B. The zone information rules are (i) all zones should be inside the AOI, (ii) minimum zone height is 5, (iii) maximum zone height is 5, and (iv) zone left edge should be on grid which has a grid width of 3. The original zone coordinates are (50, 40), (20, 40), (50, 30), and (20, 30) as shown in FIG. 12A. After the zone information rules are applied, the changed zone coordinates become (51, 35), (18, 35), (51, 30), and (18, 30). It should be noted that the changed zone coordinates are now within the AOI, have a zone height of 5, and a left edge at 51. The left edge is at 51 because of the rules which require the grid width to be 3 and the left edge to be on the grid.

Figure 13A:
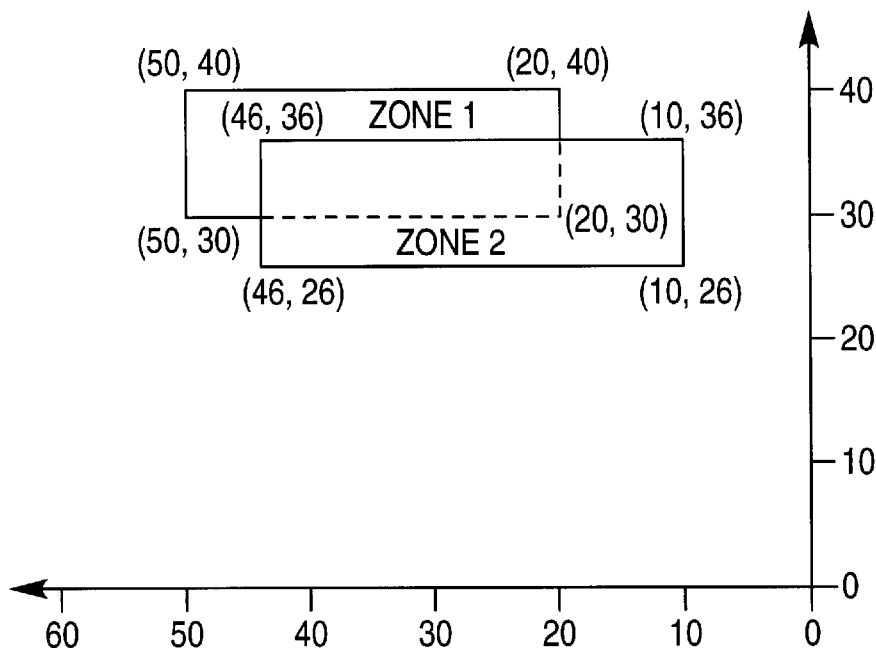
Figure 13B:
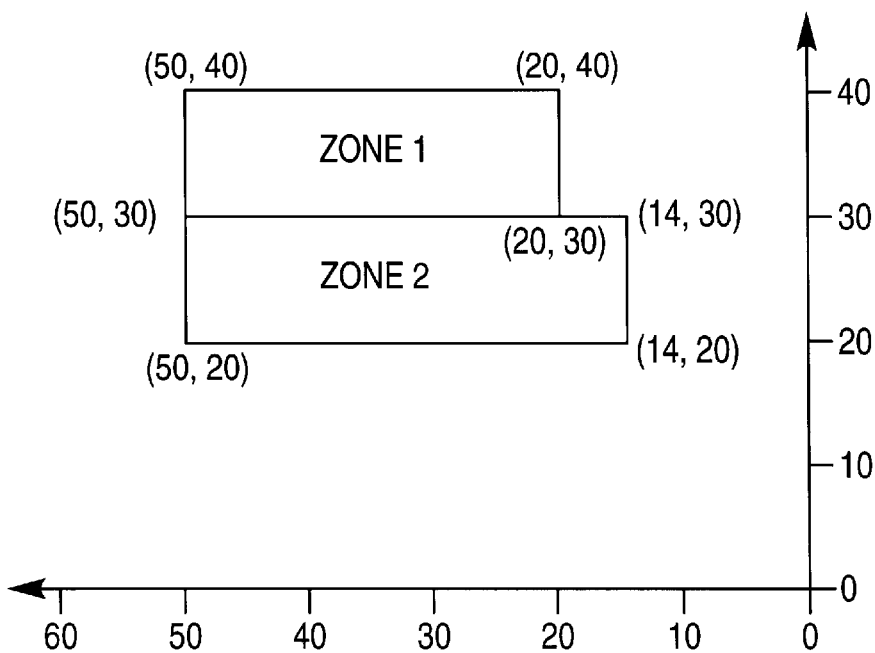

FIGS. 13A and 13B show how zone coordinates are changed using zone information rules which are directed to zone overlap of two zones (ZONE1 and ZONE2). Original position of ZONE1 and original position of ZONE2 are shown in FIG. 13A. Original position of ZONE1 has coordinates of (50, 40), (20, 40), (50, 30), and (20, 30), and original position of ZONE2 has coordinates of (46, 36), (10, 36), (46, 26), and (10, 26), as shown in FIG. 13A. The zone information rules are (i) all zones should not overlap each other, and (ii) left edges of all zones should be the same. After the zone information rules are applied, the changed zone coordinates of ZONE1 become (50, 40), (20, 40), (50, 30), and (20, 30) and the changed zone coordinates of ZONE2 become (50, 30), (14, 30), (50, 20), and (14, 20), as shown in FIG. 13B. It should be noted that after the zone coordinates of ZONE1 and ZONE2 do not overlap and are aligned at their left edges after their zone coordinates are changed.

Figure 14A:
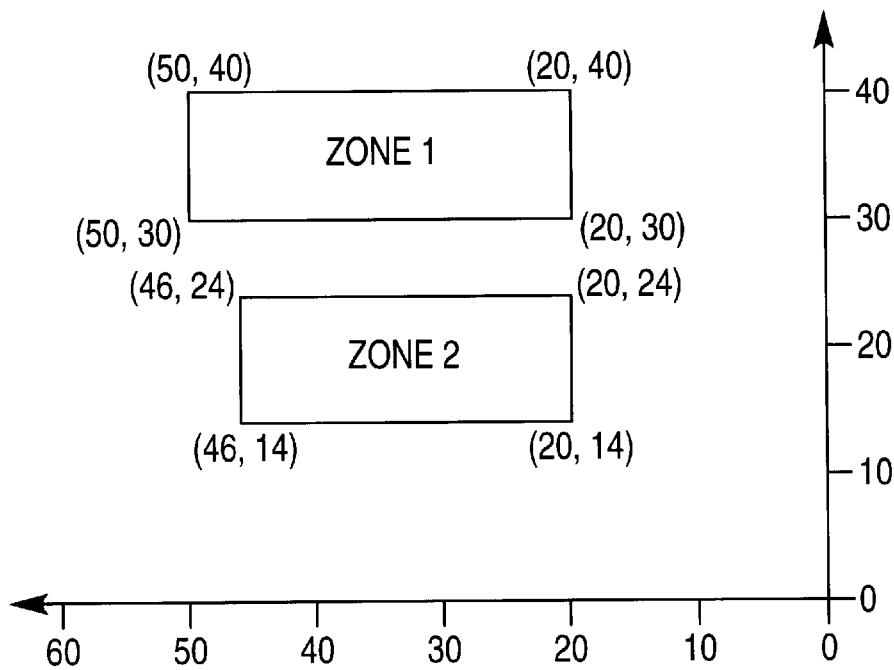
Figure 14B:
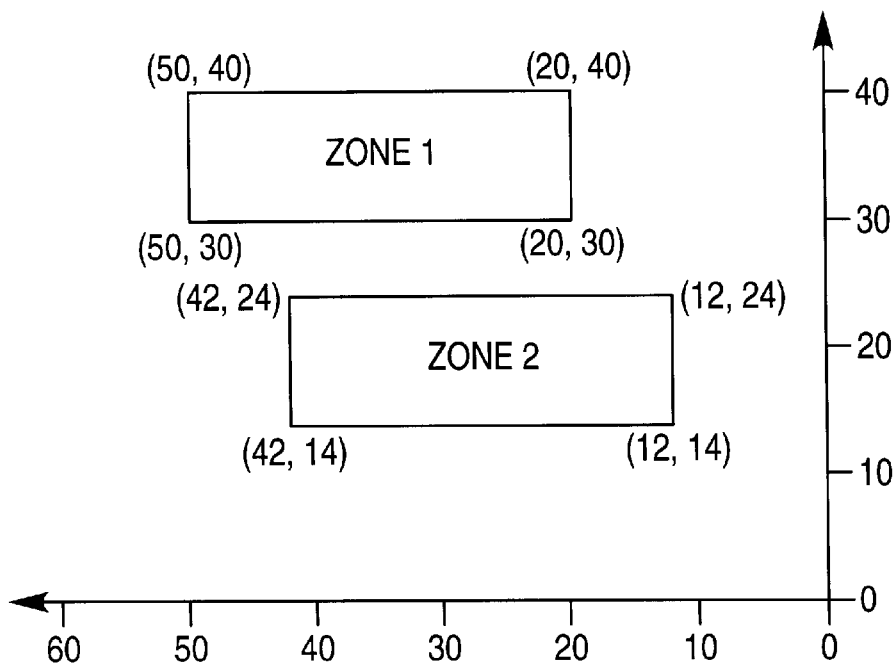

FIGS. 14A and 14B show how zone coordinates are changed using zone information rules which are directed to providing a minimum gap between the left edges of two zones (ZONE1 and ZONE2) arid the right edges of the two zones. Original position of ZONE1 and original position of ZONE2 are shown in FIG. 14A. Original position of ZONE1 has coordinates of (50, 40), (20, 40), (50, 30), and (20, 30), and original position of ZONE2 has coordinates of (46, 24), (20, 24), (46, 14), and (20, 14), as shown in FIG. 14A. The zone information rule is that the minimum gap between any left edges and any right edges is 8. After the zone information rule is applied, the changed zone coordinates of ZONE1 remain the same and the zone coordinates of ZONE2 are changed to (42, 24), (12, 24), (42, 14), and (12, 14), as shown in FIG. 14B. It should be noted that there is a minimum gap of 8 between the left edge of ZONE1 and the left edge of ZONE2 and that there is a minimum gap of 8 between the right edge of ZONE1 and the right edge of ZONE2 after the zone coordinates of ZONE1 and ZONE2 are changed. It should also be noted that the gap between the left edge of ZONE2 and the right edge of ZONE1 is greater than the minimum allowable value of 8.

Figure 15A:
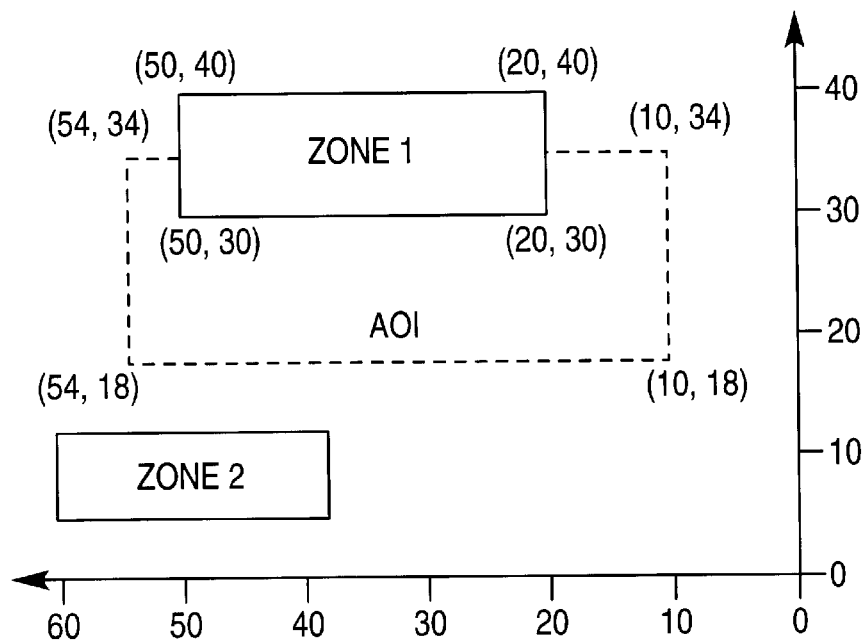
Figure 15B:
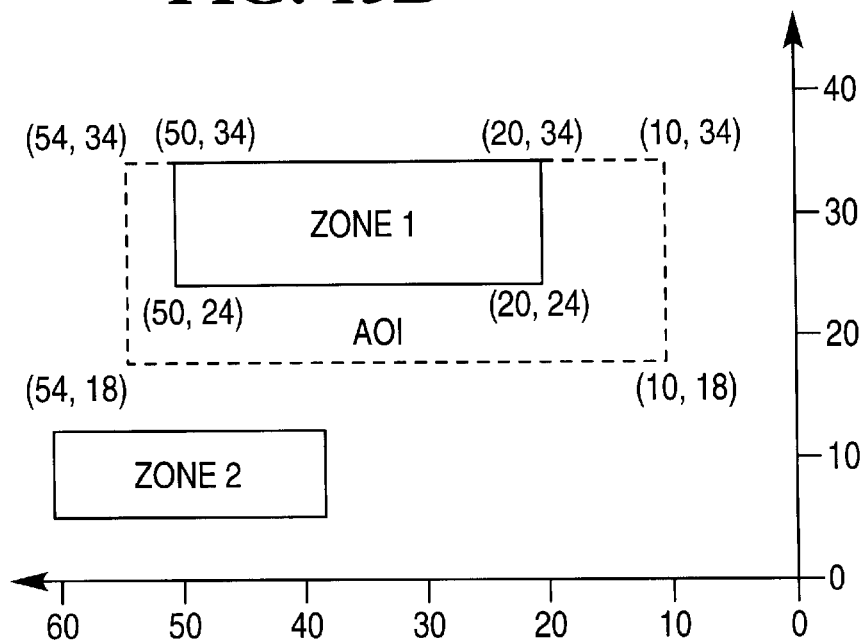

FIGS. 15A and 15B show how zone coordinates are changed using zone information rules which are directed to at least two zones and an area of interest (AOI). The AOI has coordinates of (54, 34), (10, 34), (54, 18), and (10, 18), as shown in FIGS. 15A and 15B. Original position of ZONE1 and original position of ZONE2 are shown in FIG. 15A. ZONE1 is partially within the AOI and ZONE2 is entirely outside of the AOI. Original position of ZONE1 has zone coordinates of (50, 40), (20, 40), (50, 30), and (20, 30), as shown in FIG. 15A. The zone information rules are (i) verify only one zone, and (ii) all zones should be inside AOI. After the zone information rules are applied, the zone coordinates of ZONE1 are changed to (50, 34), (20, 34), (50, 24), and (20, 24). It should be noted that ZONE1 now lies entirely within the AOI. The zone coordinates of ZONE2 are not changed since the maximum number of zones to be considered is one as per the zone information rules. ZONE2 still lies entirely outside of the AOI.

Figure 16A:
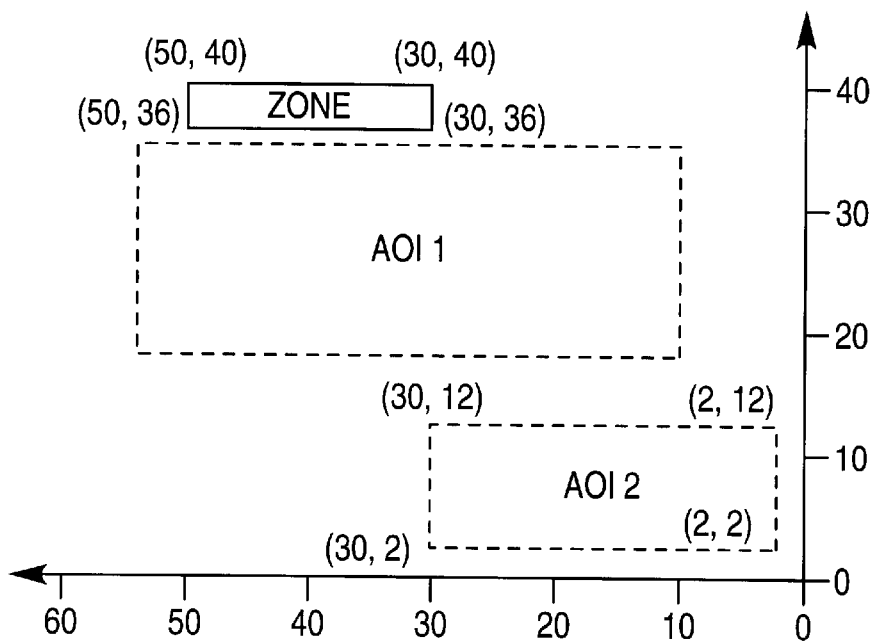
Figure 16B:
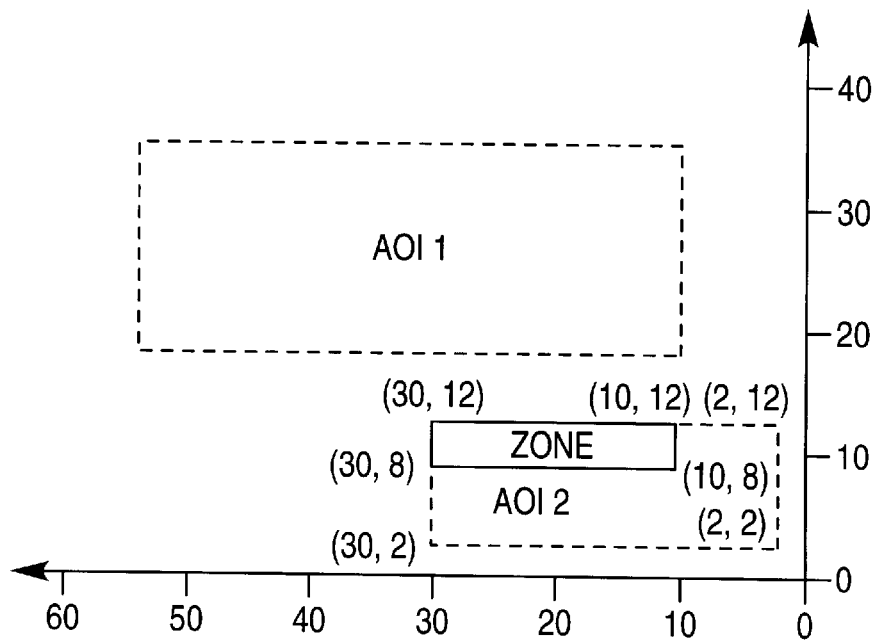

FIGS. 16A and 16B show how zone coordinates are changed using zone information rules which are directed to selecting one of two areas of interest (AOI 1 and AOI 2) as shown in FIGS. 16A and 16B. The zone information rules are (i) select AOI 2, and (ii) all zones should be inside AOI 2. The zone coordinates of AOI 2 are (30, 12), (2, 12), (30, 2), and (2, 2) as shown in FIGS. 16A and 16B. After the zone information rules are applied, the zone coordinates of the zone are changed to (30, 12), (10, 12), (30, 8), and (10, 8). It should be noted that the zone now lies within AOI 2.

A number of advantages are provided when data zones are drawn, verified, and adjusted if needed in accordance with the processes described hereinabove. One advantage is that guesswork is taken out of the task of setting up data zones for a particular transport application. Another advantage is that since operation of the zone verifier 68 is based upon a set of rules contained in a database, new hardware devices for use in the transport can be supported by simply adding new rules to the set of rules contained in the database without requiring any changes to the zone verifier 68 itself. Still another advantage is that the process of setting up data zones for a particular transport application is less prone to operator error and requires less time to accomplish.

A number of advantages are also provided when the zone verifier 68 is used in operating mode. One advantage is that zone coordinates which are sent to the hardware devices from the transport application program via the transport controller 70, are acceptable to the hardware devices, This eliminates disruptions that may happen if incorrect zone coordinates are sent to the hardware devices.

Figure 17:
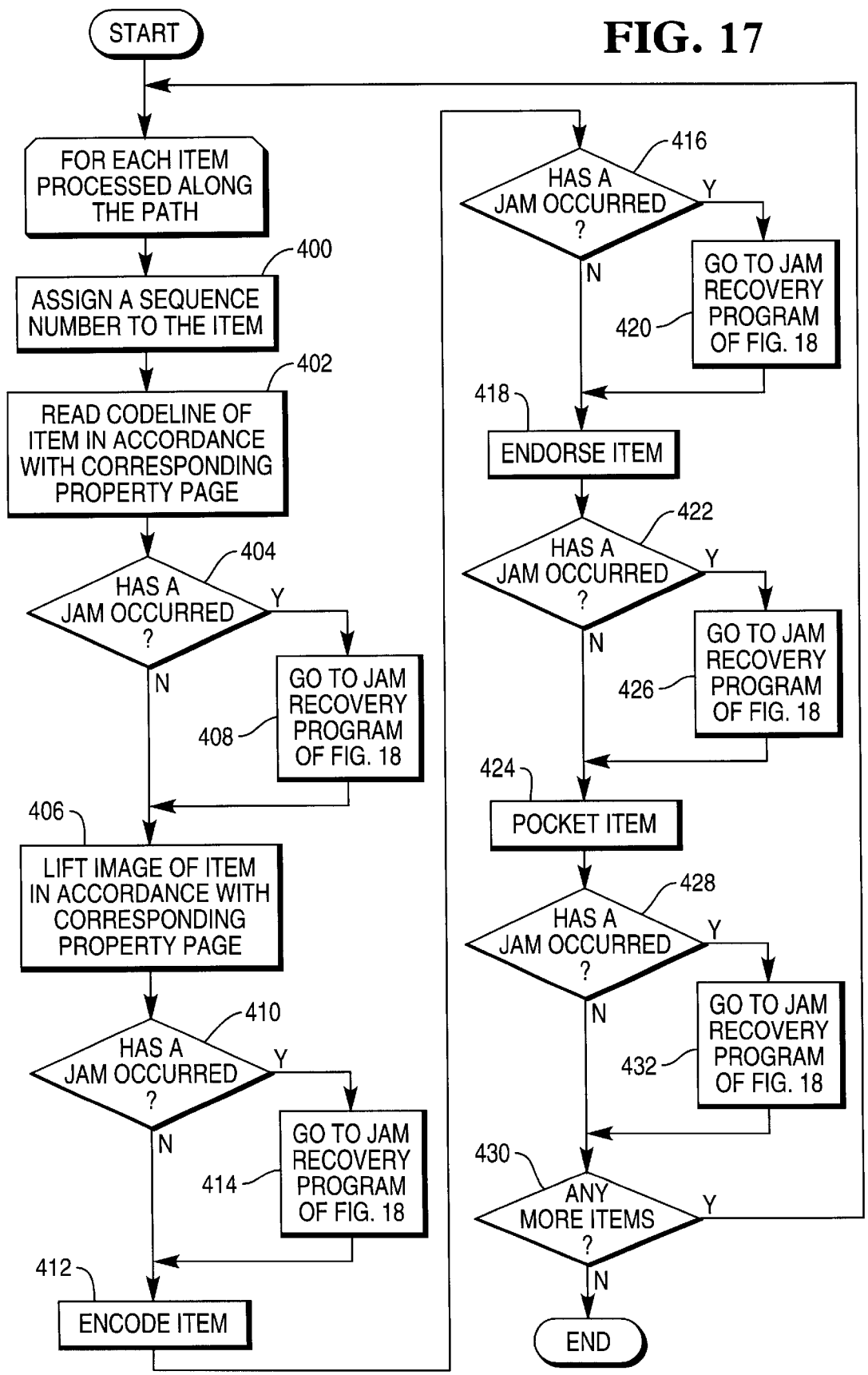
FIGS. 17 and 18 are flowcharts depicting processes carried out during exception recovery in the check processing system of FIG. 1.
Figure 18:
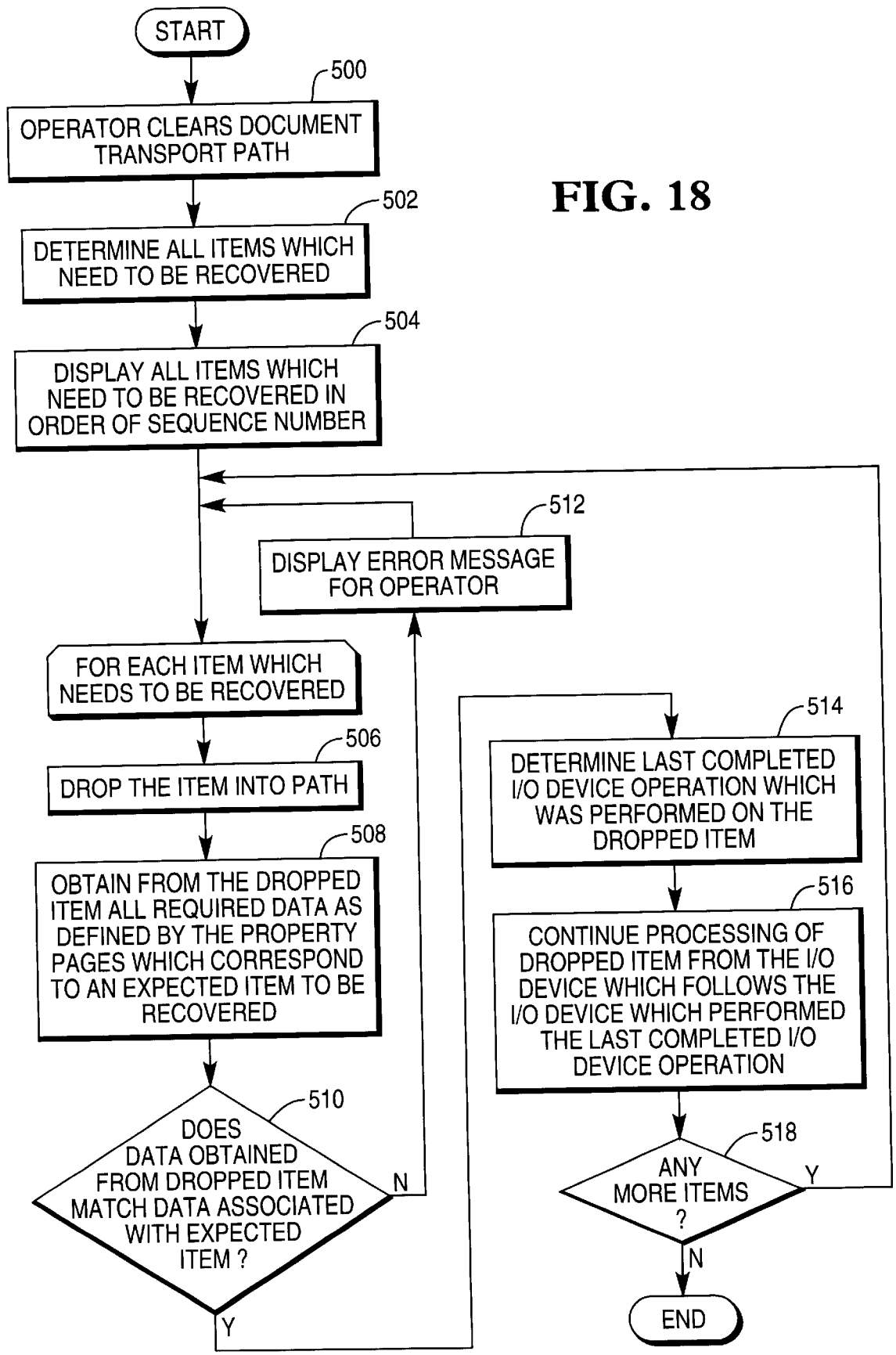

Referring to FIGS. 17 and 18, a flowchart depicts operation of the exception recovery program 74 shown in FIG. 4 during an exception recovery condition in the check processing system 10.

When an exception condition occurs along the document transport path 14, an exception recovery process is initiated. FIG. 17 is a flowchart which depicts typical normal operation of the check processing system of FIG. 1. FIG. 18 is a flowchart which depicts the exception recovery program 74 which is invoked by the program of FIG. 17 when an exception condition occurs.

In step 400, a sequence number is assigned to each item which is processed along the document transport path 14. The MICR codeline of the item is then read in accordance with the corresponding property page as already described hereinabove, as shown in step 402. A determination is then made in step 404 as to whether an exception condition has occurred after reading the MICR codeline for the particular item. If the determination in step 404 is negative, the process proceeds directly to step 406. Otherwise, if a determination is made in step 404 that an exception condition such as an exception condition has occurred, then the process proceeds to step 408 to invoke the exception recovery program of FIG. 18 which will described later.

In step 406, an image of the item is lifted in accordance with the corresponding property page as already described hereinabove. A determination is then made in step 410 as to whether an exception condition has occurred after lifting the image for the particular item. If the determination in step 410 is negative, the process proceeds directly to step 412. Otherwise, if a determination is made in step 410 that an exception condition has occurred, then the process proceeds to step 414 to invoke the exception recovery program of FIG. 18.

In step 412, the item is encoded in accordance with the corresponding property page as already described hereinabove. A determination is then made in step 416 as to whether an exception condition has occurred after encoding the particular item. If the determination in step 416 is negative, the process proceeds directly to step 418. Otherwise, if a determination is made in step 416 that an exception condition has occurred, then the process proceeds to step 420 to invoke the exception recovery program of FIG. 18.

In step 418, the item is endorsed in accordance with the corresponding property page as already described hereinabove. A determination is then made in step 422 as to whether an exception condition has occurred after endorsing the particular item. If the determination in step 422 is negative, the process proceeds directly to step 424. Otherwise, if a determination is made in step 422 that an exception condition has occurred, then the process proceeds to step 426 to invoke the exception recovery program of FIG. 18.

In step 424, the item is pocketed in accordance with the corresponding property page as already described hereinabove. A determination is then made in step 428 as to whether an exception condition has occurred after pocketing the particular item. If the determination in step 428 is negative, the process proceeds directly to step 430. Otherwise, if a determination is made in step 428 that an exception condition has occurred, then the process proceeds to step 432 to invoke the exception recovery program of FIG. 18.

In step 430, a determination is made as to whether there are any more items to process. If the determination is affirmative, then the process loops back to the start to process the next item to be processed. However, if the determination in step 430 is negative, then all items have been processed and the process terminates.

The flowchart of FIG. 18 depicts operation of the exception recovery program 74 referred to hereinabove. In step 500, the operator clears the document transport path 14 by removing all items from the document transport path. Then, in step 502, the transport controller 70 determines all items which need to be recovered. This determination is made based upon data contained in the item control memory 72 as is known. All items which need to be recovered are displayed in order of their sequence numbers as shown in step 504.

For each item which needs to be recovered, the item is hand dropped into the document transport path 14, as shown in step 506. The process then proceeds to step 508. In step 508, all required data as defined by the property pages which correspond to an expected item to be recovered from the document transport path 14 is obtained by the transport controller 70. The process then proceeds to step 510 in which a determination is made as to whether the data obtained in step 508 from the hand dropped item and the data associated with the expected item match. If the determination in step 510 is negative, then the process proceeds to step 512 in which an error message is displayed for the operator to view before looping back to step 506. At this point, the operator needs to manually obtain the correct item to hand drop into the document transport path 14. Otherwise, the process cannot proceed any further.

However, if the determination in step 510 is affirmative, then the process proceeds to step 514. In step 514, the transport controller 70 determines the last completed I/O device operation which was performed for that particular hand dropped item. The transport controller 70 makes this determination using data from the item control memory 72 based upon the sequence numbers of items. As previously described, data contained in the item control memory 72 is based upon data received from the transport 12 including the hardware devices used in the transport. More specifically, after an item is processed by a particular hardware device, a respective status signal is stored in the item control memory 72 to indicate that the item has been completely processed by that particular hardware device. It should be apparent that if an exception condition occurs, then the most recent status signal which was stored for the item is indicative of the corresponding hardware device performing the last I/O operation on the item. After the determination is made in step 514, the process proceeds to step 516.

In step 516, the transport controller 70 continues processing of the particular hand dropped item from the hardware device which immediately follows the hardware device which performed the last completed I/O operation on that item as determined in previous step 514. If there are any more items to be considered during exception recovery, as shown in step 518, then the process terminates relative to that particular dropped item and loops back to step 506 in which the next item that needs to be recovered is hand dropped into the document transport path 14. Otherwise, if there are no more items to be considered during exception recovery, the process terminates and returns back to the process shown in the flowchart of FIG. 17.

A number of advantages are provided when the above-described process is carried out during exception recovery. One advantage is that an operator need not be concerned with settings of any of the hardware devices when item is to be hand dropped into the document transport path 14 during exception recovery. The operator need not be concerned with settings of any of the hardware devices because the transport controller 70 already knows which hardware device performed the last completed I/O operation on the particular item to be hand dropped, as determined in step 514. Accordingly, the transport controller 70 knows that any hardware device preceding the hardware device which performed the last completed I/O operation need not be operated at all to process the item to be hand dropped. The transport controller 70 also knows that only hardware devices (if any) following the hardware device which performed the last completed I/O operation will be operated to process the item to be hand dropped. Since an operator need not be concerned with settings of any of the hardware devices when an item is to be hand dropped into the document transport path 14, less manual effort is required of the operator during the exception recovery process. This results in savings of time and labor and, therefore, costs associated with operating the check processing system 10.

It is contemplated that any combination of the above-described programs be available on portable storage media, such as a compact disc read only memory (CDROM). The programs on a CDROM may be installed on different financial document processing systems to provide these systems with corresponding capabilities as described hereinabove. It is also contemplated that the above-described programs may be used in other types of financial document processing systems, such as non-image-based systems, for example.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A check processing transport comprising:
   means defining a transport path;
   a check processing module disposed along the transport path;
   a memory for storing a plurality of sets of zone verification rules;
   means for receiving a set of zone coordinates which are intended to define a zone which corresponds to an allowable data zone of a document to be processed by the check processing module disposed along the transport path;
   means for identifying type of the check processing module disposed along the transport path;
   means for retrieving a set of zone verification rules from the memory based upon the identified type of the check processing module; and
   means for applying the zone verification rules contained in the retrieved set of zone verification rules to the received set of zone coordinates to determine if the set of zone coordinates defines a zone which corresponds to the allowable data zone of the document to be processed by the check processing module disposed along the transport path.

2. A check processing transport according to claim 1, further comprising means for applying the zone verification rules contained in the retrieved set of zone verification rules to the received set of zone coordinates to adjust the set of zone coordinates when the set of zone coordinates is determined to not define a zone which corresponds to the allowable data zone of the document to be processed by the check processing module disposed along the transport path.

3. A check processing transport according to claim 1, wherein the check processing module comprises a codeline reader.

4. A check processing transport according to claim 3, wherein the codeline reader comprises a MICR codeline reader.

5. A check processing transport according to claim 1, wherein the check processing module comprises an image capture subsystem.

6. A check processing transport according to claim 1, wherein the check processing module comprises an encoder.

7. A check processing transport according to claim 1, wherein the check processing module comprises an endorser.

8. A check processing transport according to claim 1, wherein the check processing module comprises a bank stamp.

9. A financial document processing system for processing documents other than currency, the financial document processing system comprising:
   means defining a transport path;
   a hardware device disposed along the transport path;
   a memory for storing a plurality of sets of zone verification rules;
   means for receiving a set of zone coordinates which are intended to define a zone which corresponds to an allowable data zone of a document to be processed by the hardware device disposed along the transport path;
   means for identifying type of the hardware device disposed along the transport path;
   means for retrieving a set of zone verification rules from the memory based upon the identified type of the hardware device; and
   means for applying the zone verification rules contained in the retrieved set of zone verification rules to the received set of zone coordinates to determine if the set of zone coordinates defines a zone which corresponds to the allowable data zone of the document to be processed by the hardware device disposed along the transport path.

10. A financial document processing system according to claim 9, further comprising means for applying the zone verification rules contained in the retrieved set of zone verification rules to the received set of zone coordinates to adjust the set of zone coordinates when the set of zone coordinates is determined to not define a zone which corresponds to the allowable data zone of the document to be processed by the hardware device disposed along the transport path.

11. A method of processing a set of zone coordinates which are intended to define an allowable data zone of a document to be processed in a check processing transport having a transport path and a check processing module disposed along the transport path, the method comprising the steps of:
    (a) receiving a set of zone coordinates which are intended to define a zone which corresponds to the allowable data zone of the document;
    (b) identifying type of the check processing module disposed along the transport path of the check processing transport;
    (c) retrieving a set of zone verification rules from a memory based upon the type of the check processing module as identified in step (b); and
    (d) applying the zone verification rules contained in the set of zone verification rules retrieved in step (c) to the set of zone coordinates received in step (a) to determine if the set of zone coordinates defines a zone which corresponds to the allowable data zone of the document.

12. A method according to claim 11, further comprising the step of:
    (e) applying the zone verification rules contained in the set of zone verification rules retrieved in step (c) to the set of zone coordinates received in step (a) to adjust the set of zone coordinates when the set of zone coordinates is determined to not define a zone which corresponds to the allowable data zone of the document.

13. A method of processing a first and second sets of zone coordinates which are intended to define first and second allowable data zones, respectively, of a document to be processed in a check processing transport having a transport path and a hardware device disposed along the transport path, the method comprising the steps of:

(a) receiving first and second sets of zone coordinates which are intended to define respective zones which correspond, respectively, to the first and second allowable data zones of the document to be processed;

(b) identifying type of the hardware device disposed along the transport path;

(c) retrieving first and second sets of zone verification rules from a memory based upon the type of the hardware device as identified in step (b);

(d) applying the zone verification rules contained in the first set of zone verification rules retrieved in step (c) to the first set of zone coordinates received in step (a) to determine if the first set of zone coordinates defines a zone which corresponds to the first allowable data zone of the document; and (e) applying the zone verification rules contained in the second set of zone verification rules retrieved in step (c) to the second set of zone coordinates received in step (a) to determine if the second set of zone coordinates defines a zone which corresponds to the second allowable data zone of the document.

14. A method according to claim 13, further comprising the steps of:

(f) applying the zone verification rules contained in the first set of zone verification rules retrieved in step (c) to the first set of zone coordinates received in step (a) to adjust the first set of zone coordinates when the first set of zone coordinates is determined to not define a zone which corresponds to the first allowable data zone of the document; and (g) applying the zone verification rules contained in the second set of zone verification rules retrieved in step (c) to the second set of zone coordinates received in step (a) to adjust the second set of zone coordinates when the second set of zone coordinates is determined to not define a zone which corresponds to the second allowable data zone of the document.

15. A program storage medium readable by a computer having a memory, the medium tangibly embodying one or more programs of instructions executable by the computer to perform method steps for processing a set of zone coordinates which are intended to define an allowable data zone of a document to be processed in a check processing transport having a transport path and a check processing module disposed along the transport path, the method comprising the steps of:

(a) receiving a set of zone coordinates which are intended to define a zone which corresponds to the allowable data zone of the document;

(b) identifying type of the check processing module disposed along the transport path of the check processing transport;

(c) retrieving a set of zone verification rules from a memory based upon the type of the check processing module as identified in step (b); and (d) applying the zone verification rules contained in the set of zone verification rules retrieved in step (c) to the set of zone coordinates received in step (a) to determine if the set of zone coordinates defines a zone which corresponds to the allowable data zone of the document.

16. A program storage medium according to claim 15, further comprising the step of:

(e) applying the zone verification rules contained in the set of zone verification rules retrieved in step (c) to the set of zone coordinates received in step (a) to adjust the set of zone coordinates when the set of zone coordinates is determined to not define a zone which corresponds to the allowable data zone of the document.

17. A program storage medium readable by a computer having a memory, the medium tangibly embodying one or more programs of instructions executable by the computer to perform method steps for processing a first and second sets of zone coordinates which are intended to define first and second allowable data zones, respectively, of a document to be processed in a check processing transport having a transport path and a hardware device disposed along the transport path, the method comprising the steps of:

(a) receiving first and second sets of zone coordinates which are intended to define respective zones which correspond, respectively, to the first and second allowable data zones of the document to be processed;

(b) identifying type of the hardware device disposed along the transport path;

(c) retrieving first and second sets of zone verification rules from a memory based upon the type of the hardware device as identified in step (b);

(d) applying the zone verification rules contained in the first set of zone verification rules retrieved in step (c) to the first set of zone coordinates received in step (a) to determine if the first set of zone coordinates defines a zone which corresponds to the first allowable data zone of the document; and (e) applying the zone verification rules contained in the second set of zone verification rules retrieved in step (c) to the second set of zone coordinates received in step (a) to determine if the second set of zone coordinates defines a zone which corresponds to the second allowable data zone of the document.

18. A program storage medium according to claim 17, further comprising the steps of:

(f) applying the zone verification rules contained in the first set of zone verification rules retrieved in step (c) to the first set of zone coordinates received in step (a) to adjust the first set of zone coordinates when the first set of zone coordinates is determined to not define a zone which corresponds to the first allowable data zone of the document; and (g) applying the zone verification rules contained in the second set of zone verification rules retrieved in step (c) to the second set of zone coordinates received in step (a) to adjust the second set of zone coordinates when the second set of zone coordinates is determined to not define a zone which corresponds to the second allowable data zone of the document.

* * * * *